(12) United States Patent
Kodama

(10) Patent No.: US 7,913,045 B2
(45) Date of Patent: Mar. 22, 2011

(54) STORAGE SYSTEM COMPRISING BACKUP FUNCTION

(75) Inventor: Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 11/765,799

(22) Filed: Jun. 20, 2007

(65) Prior Publication Data

US 2008/0162846 A1 Jul. 3, 2008

(30) Foreign Application Priority Data

Dec. 28, 2006 (JP) ................................. 2006-353678

(51) Int. Cl.
*G06F 12/00* (2006.01)
(52) U.S. Cl. ................................. 711/162; 711/E12.084
(58) Field of Classification Search .................. 711/113, 711/115, 118, 162
See application file for complete search history.

(56) References Cited

U.S. PATENT DOCUMENTS

| | | | |
|---|---|---|---|
| 6,205,527 B1 | 3/2001 | Goshey et al. | |
| 6,269,431 B1 | 7/2001 | Dunham | |
| 6,289,426 B1 | 9/2001 | Maffezzoni et al. | |
| 6,385,707 B1 | 5/2002 | Maffezzoni | |
| 6,477,629 B1 | 11/2002 | Goshey et al. | |
| 6,532,535 B1 | 3/2003 | Maffezzoni et al. | |
| 6,611,850 B1 | 8/2003 | Shen | |
| 6,684,229 B1 | 1/2004 | Luong et al. | |
| 6,757,698 B2 | 6/2004 | McBride et al. | |
| 6,959,369 B1* | 10/2005 | Ashton et al. | 711/162 |
| 7,277,987 B2* | 10/2007 | Sato et al. | 711/114 |
| 7,500,053 B1* | 3/2009 | Kavuri et al. | 711/114 |
| 2001/0049776 A1* | 12/2001 | Maeda | 711/162 |
| 2002/0059505 A1* | 5/2002 | St. Pierre et al. | 711/162 |
| 2003/0061456 A1* | 3/2003 | Ofek et al. | 711/162 |
| 2005/0251517 A1 | 11/2005 | Watanabe et al. | |

FOREIGN PATENT DOCUMENTS

| | | | |
|---|---|---|---|
| CN | 1469251 A | | 1/2004 |
| CN | 1822004 A | | 8/2006 |
| EP | 1645960 A1 | * | 4/2006 |
| JP | 2001-216185 A | | 8/2001 |

* cited by examiner

*Primary Examiner* — Matt Kim
*Assistant Examiner* — Sean Rossiter
(74) *Attorney, Agent, or Firm* — Sughrue Mion, PLLC

(57) ABSTRACT

A storage resource including one or more first storage devices; a first logical volume formed according to storage space of the storage resource; a member for accommodating a removable second storage device selected by a user; and a backup unit, the backup unit executing a backup of data stored in the first logical volume to a second logical volume formed according to storage space of the removable second storage device mounted in the member and paired with the first logical volume; and storing, in said storage resource, of backup generation information elements pertaining to what generation of the backup the current backup of the first logical volume is.

16 Claims, 17 Drawing Sheets

EXTERNAL APPEARANCE OF STORAGE SYSTEM

BLOCK DIAGRAM OF THE HARDWARE CONFIGURATION OF A STORAGE SYSTEM PERTAINING TO A FIRST EMBODIMENT

PROCESSING FLOW OF DISK INSERTION PROCESSING

PROCESSING FLOW OF DIFFERENTIAL BACKUP PROCESSING

PROCESSING FLOW OF NEW BACKUP REQUEST PROCESSING

PROCESSING FLOW OF DISK REMOVAL PROCESSING

PROCESSING FLOW OF POST-PAIR CONVERSION PROCESSING

SCHEMATIC DIAGRAM OF MODULE OF A MICROPROGRAM

BACKUP RELATIONSHIP BETWEEN LU

INFORMATION STORED IN BACKUP DISK

FIG. 12A
DISK MANAGEMENT INFORMATION

DISK MANAGEMENT INFORMATION

| DISK IDENTIFIER | 1976_10_27_KONISHI | ~1201 |
| DISK LU INFORMATION REQUEST LIST | ARRANGEMENT OF DISK LU INFORMATION FOR EACH LU | ~1202 |

1101

FIG. 12B
DISK LU INFORMATION

DISK LU INFORMATION REQUEST

1203

| DISK LU NO. | 1973 | ~1204 |
| LU SIZE | 11GB | ~1205 |
| LU POSITION | 28 | ~1206 |
| PAIR NO. | 32 | ~1207 |
| PAIR STATE | PAIR | ~1208 |
| FINAL BACKUP TIMING | UC0078/1/3 10:31:28 | ~1209 |

FIG. 13
PAIR MANAGEMENT TABLE

PAIR MANAGEMENT TABLE

1301

| PAIR NO. | 32 | ~1302 |
| PRIMARY LUN | 1973 | ~1303 |
| SECONDARY LU DISK IDENTIFIER | 1976_10_27_KONISHI | ~1304 |
| SECONDARY LUN | 0207 | ~1305 |
| PAIR STATE | PAIR | ~1306 |
| FINAL BACKUP TIMING |  | ~1307 |

BITMAP UPDATING FLOW

BLOCK DIAGRAM OF HARDWARE CONFIGURATION OF
STORAGE SYSTEM PERTAINING TO A SECOND EMBODIMENT

MANAGEMENT SCREEN

DISK INSERTION PROCESSING FLOW

PROCESSING FLOW OF RESTORE PROCESSING

PATTERN 1 OF PLURALITY OF SECONDARY LU IN A SINGLE DISK

PATTERN 2 OF PLURALITY OF SECONDARY LU IN A SINGLE DISK

BLOCK DIAGRAM OF ANOTHER EXAMPLE OF
A HARDWARE CONFIGURATION OF A STORAGE SYSTEM

BLOCK DIAGRAM OF A FURTHER EXAMPLE OF A HARDWARE CONFIGURATION OF A STORAGE SYSTEM

STORAGE SYSTEM COMPRISING BACKUP FUNCTION

CROSS-REFERENCE TO PRIOR APPLICATION

This application relates to and claims the benefit of priority from Japanese Patent Application number 2006-353678, filed on Dec. 28, 2006 the entire disclosure in which is incorporated herein by reference.

BACKGROUND

The present invention relates to a storage system comprising a backup function.

Techniques pertaining to backup include, for example, a technique for performing data copy in a storage system (hereinafter, storage system data copy technique). This type of technique is disclosed in, for example, Japanese Unexamined Patent Application No. 2001-216185. This type of technique normally involves data of first logical volumes formed according to a plurality of storage devices that the storage system comprises being copied into second logical volumes formed according to these plurality of storage devices.

In storage system data copy techniques the capacity of the second logical volume is normally required to be the same as the capacity of the first logical volume serving as the copy original. For this reason, backup of the backed up data of a first logical volume across multiple generations requires the plurality of storage devices of the storage system to have an empty capacity of (first logical volume capacity×number of generations). The number of storage devices is restricted and, therefore, this presents a problem of how to backup first logical volume data across multiple generations. Not withstanding that each of the plurality of storage devices mounted in a storage system is normally interchangeable, this cannot be taken as meaning that the number of storage devices is limitless.

SUMMARY

Accordingly, it is an object of the present invention to perform backup of logical volume data across multiple generations to a restricted number of storage devices.

Additional objects of the present invention should be apparent from the following description.

A storage system comprises: a storage resource comprising one or more first storage devices; a first logical volume formed according to storage space of the storage resource; a member for accommodating a removable second storage device selected by a user; and a backup unit. The backup unit executes the following (a) and (b) processings:

(a) backup of data stored in a first logical volume to a second logical volume formed according to storage space of the removable second storage device mounted in the member and paired with the first logical volume; and (b) storing, in the storage resource, of a backup generation information element pertaining what generation of the backup the current backup of the first logical volume is.

BRIEF DESCRIPTION OF THE DRAWINGS

FIG. 12A shows an example configuration of disk management information;

FIG. 12B shows an example configuration of disk LU information elements;

FIG. 13 shows an example configuration of a pair management table;

DESCRIPTION OF THE PREFERRED EMBODIMENTS

Figure 1:
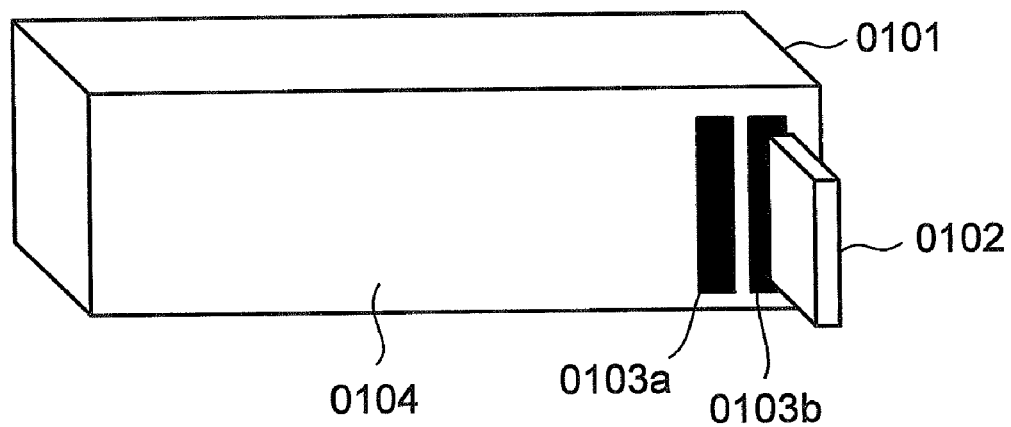
FIG. 1 shows one example of the external appearance of a storage system pertaining to a first embodiment of the present invention.

The embodiments of the present invention are outlined below.

A storage system comprises: a storage resource comprising one or more first storage devices; a first logical volume formed according to storage space of the storage resource; a member for accommodating a removable second storage device selected by a user; and a backup unit. The backup unit executes the following (a) and (b) processings:

(a) backup of data stored in a first logical volume to a second logical volume formed according to storage space of the removable second storage device mounted in the member and paired with the first logical volume; and (b) storing, in the storage resource, of a backup generation information element pertaining to what generation of the backup the current backup of the first logical volume is.

The first storage device and the removable second storage device may be storage devices of a different type or storage devices of the same type. Either a sequential access-type storage device or a random access-type storage device may be used as the storage device. Sequential access-type storage devices that can be adopted include a tape device. Random access-type storage devices that can be adopted include a Hard Disk Drive (HDD), a DVD (Digital Versatile Disk), or a flash memory device. The backup unit can perform a contact-type or noncontact-type of backup of data stored in the first logical volume to the removable second storage device mounted in the member. The backup unit, in the (b) processing, may establish association between a second storage device ID that serves as an identifier of the mounted removable second storage device and a backup generation information element.

The member can be configured from, for example, a slot into which the removable second storage device is insertable and a connector connected to the removable second storage device inserted in the slot. The user selects a removable second storage device to serve as a backup destination and inserts the selected removable second storage device in the slot. The removable second storage device inserted in the slot is connected to a connector corresponding with the slot. The backup unit can perform backup of data stored in a first logical volume to the removable second storage device connected to the connector.

When backup has finished, the user can demount the removable second storage device from the member. Even when the removable second storage device has been demounted, the storage resource stores the association between the second storage device ID and the backup generation information element (the storage resource is, for example, non-volatile). When the same or another removable second storage device has been newly mounted in the member from which the removable second storage device has been demounted, the backup unit can back up the first logical volume data to the newly mounted removable second storage device and store in the storage resource a backup generation information element that expresses the next backup generation to the immediately preceding backup generation along with a second storage device ID of the newly mounted removable second storage device. For this reason, backup of data of a first logical volume can be performed across multiple generations to a restricted number of removable second storage devices. That is to say, even using a restricted number of removable second storage devices, backup generation data of a number of generations greater than the number of removable second storage devices can be managed.

The storage system can further comprise a first detector for detecting mounting of the selected second storage device mentioned above in the member. The backup unit can execute the (a) and (b) processings described above in response to detection, by the first detector, of mounting in the member of the selected removable second storage device mentioned above.

The storage system can further comprise a guard unit for guarding each of the one or more first storage devices against demounting by a user. In other words, the first storage device may be interchangeable. In addition, the number of members may be less than the number of first storage devices.

A plurality of members may be provided. The plurality of mounting members may include a first member and a second member. The backup unit, when the selected removable second storage device mentioned above is mounted in the first member, can execute the (a) processing described above. On the other hand, when the removable selected second storage device mentioned above is mounted in the second member the backup unit executes the following (c) processing:

(c) restoring of the second logical volume data of the second storage device mounted in the second member to the first logical volume mentioned above or to another first logical volume formed according to storage space of the storage resource.

The storage system can further comprise an external command receiver for receiving from an external computer located external of the storage system a command for executing either backup or restore. The backup unit can execute the (a) processing described above when the external command receiver receives a backup command. On the other hand, when a restore command is received from the external command receiver, the backup unit can execute the following (c) processing:

(c) restoring of the second logical volume data of the removable second storage device mounted in the second member to the first logical volume mentioned above or to another first logical volume formed according to storage space of the storage resource.

The storage system can further comprise a backup/restore command receiver. The backup/restore command receiver receives commands from a user for executing either backup or restore. The backup/restore command receiver may constitute, for example, a mechanical switch or an input device provided in the storage system. The backup unit can execute the (a) processing described above when the backup/restore command receiver receives a backup command. When the backup/restore command receiver receives a restore command the backup unit can execute the following (c) processing:

(c) restoring of the second logical volume data of the removable second storage device mounted in the second member to the first logical volume mentioned above or to another first logical volume formed according to storage space of the storage resource.

The storage resource can store differential management information elements that correspond with each of a plurality of pairs in which the first logical volume serves as a constituent element. The differential management information elements constitute information elements that express the position, in the first logical volume, of differential data blocks that constitute data blocks equivalent to the differential between the second logical volume and the first logical volume which are the constituent elements of a pair corresponding to the differential management information elements. The backup unit, in the (a) processing, can specify the position in the first logical volume of the differential data blocks on the basis of the differential management information elements of the plurality of differential management information elements that correspond with a target pair which constitutes a pair in which the second logical volume of the removable second storage device mounted in the member serves as the constituent element, and can back up the differential data blocks in the specified positions to positions of the second logical volume that correspond to the specified positions.

The storage system can further comprise an I/O processor. The I/O processor can receive an I/O request from an external computer provided external of the storage system that designates the first logical volume and write the write target data designated by the I/O request in the first logical volume designated by the I/O request received from the external computer. The storage resource can further store the pair state that corresponds with each of the plurality of pairs in which the first logical volume serves as the constituent element. When the pair state of the pairs in which the first logical volume serves as a constituent element is a first-type status, the I/O processor, whenever a data block of the write target data is written in a first logical volume, can update the differential management information elements that correspond to the pair to a state of existence of differential data blocks in the write destination position. The backup unit initializes backup after updating the pair state that corresponds to the target pair to a second-type status and, when the backup has been completed, can update the differential management information elements that correspond with the target pair to a state of absence of differential data blocks, and can update the pair state that corresponds to the target pair to a first-type status.

The backup unit, in the (b) processing mentioned above, after updating of the pair state that corresponds to the target pair to a first-type status, can further store in the second storage device pair management information elements that constitute information pertaining to the target pair. Following which, when the second storage device is demounted from the member and the demounted removable second storage device or another storage device selected by a user is mounted in the member, in the (a) processing mentioned above, the backup unit can specify the differential management information elements that correspond to the pair management information elements of the second storage device mounted in the member. The specified differential management information elements constitute differential management information elements that correspond with pairs in which the second logical volume of the second storage device serves as the constituent element. The backup unit can perform backup to the second logical volume of the newly mounted second storage device on the basis of the specified differential management information elements, and can specify the position of differential data blocks in the first logical volume.

The backup unit, whenever differential data blocks are backed up in a second logical volume, can read the differential data blocks from the second logical volume and compare the read differential data blocks with the backup differential data blocks and, when these differential data blocks match, can update to the specified positions mentioned above with differential data blocks the differential management information elements that correspond with the target pair. More specifically, for example, the storage system can further comprise a cache memory, and the backup unit can temporarily store the differential data blocks read from a first logical volume to the cache memory, backup the differential data blocks to a second logical volume, read the differential data blocks from the second logical volume, and compare the read differential data blocks with the differential data blocks mentioned above stored in the cache memory.

The storage system may further comprise a second detector for detecting demounting of the removable second storage device from the member. The backup unit, in response to detection by the second detector of demounting of the removable second storage device from the member, can update the pair state that corresponds with the target pair to a first-type status.

The backup unit, in the (b) processing mentioned above, can further store in a second storage device pair management information elements that constitute information pertaining to the target pair, following which, when the second storage device is demounted from the member and the demounted removable second storage device or another second storage device selected by a user has been newly mounted in the member, in the (a) processing mentioned above, it can specify differential management information elements that correspond to the pair management information elements of the removable second storage device mounted in the member. The specified differential management information elements constitute differential management information elements that correspond with pairs in which a second logical volume of the second storage device serves as the constituent element.

The units (e.g. said backup unit) described above can be constructed from hardware and a computer programs or an assembly thereof (for example, a part thereof is actualized with a computer program while the remainder is actualized with hardware). The computer program can be read into a predetermined processor and executed. The computer program may be installed in the computer from a storage medium such as a CD-ROM, and may be downloaded to the computer by way of a communication network.

Several embodiments of the present invention will be hereinafter described in detail. Notably, in the description that follows, each of the first and second storage devices are taken to be Hard Disk Drives, the Hard Disk Drive being referred to simply as a "disk". In addition, the logical volumes are abbreviated and referred to as either "logical unit" or simply "LU".

First Embodiment

FIG. 1 shows one example of the external appearance of a storage system pertaining to a first embodiment of the present invention. The region of the interface and power source and so on has been omitted from FIG. 1.

A plurality of disks is loaded in advance in a storage system (0101) A user cannot interchange the disks loaded in advance. Examples of methods that can be adopted for preventing the interchange thereof include, as shown in the diagram, a method for preventing the user from touching the disks loaded in advance by provision of a shield member (0104), and a method in which a lock that cannot be unlocked without the use of a predetermined password is fixed to the disks loaded in advance.

The storage system (0101) comprises slots (0103a, 0103b). While in the example illustrated in the diagram any number of slots (0103a, 0103b) may be provided, two are used in this embodiment. A disk (0102) is inserted in the slots (0103a, 0103b). If disks (0102) are inserted in each of the two slots (0103a, 0103b), the maximum number of disks loadable in the storage system (0101) is the number of disks loaded in advance plus two. These slots are hereinafter referred to as "extension slots". In addition, the disks loaded in advance are referred to as "internal disks", and the disks inserted in the extension slots are referred to as "backup disks". Furthermore, when a single constituent element of a plurality of constituent elements of the same type is used as an example in the following description confusion between the plurality or singularity thereof is avoided by either employing a new number exclusively for the plurality of constituent elements of the same type (for example (0103) in the case of (0103a)) or by using an arbitrary constituent element of the plurality of constituent elements of the same type as an example.

Figure 2:
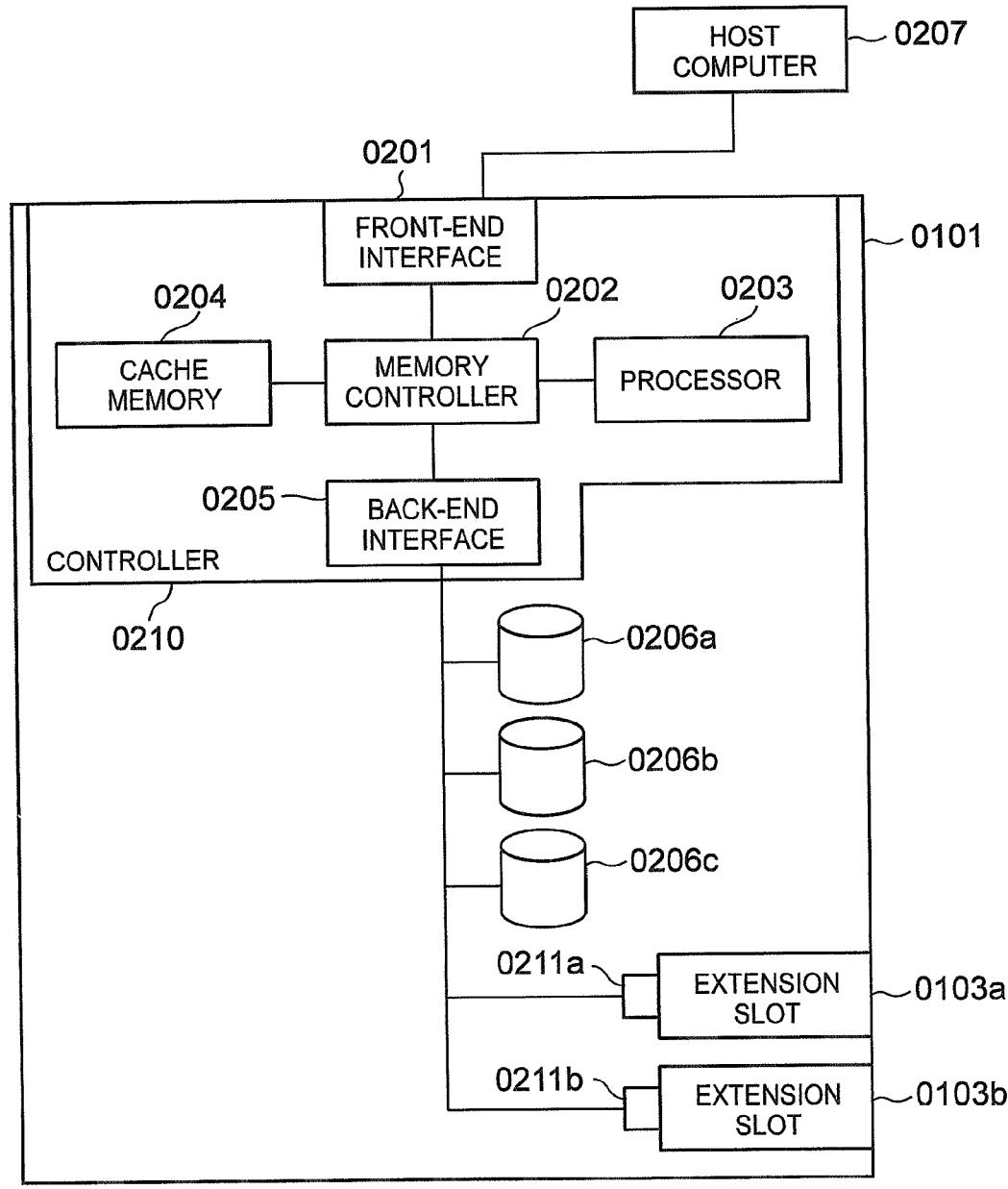
FIG. 2 is a block diagram showing an example configuration of hardware of the storage system of FIG. 1.

FIG. 2 is a block diagram showing an example configuration of the hardware configuration of the storage system of FIG. 1.

The storage system (0101) comprises a front-end interface (0201), a memory controller (0202), a processor (0203), a cache memory (0204), a back-end interface (0205), internal disks (0206a, 0206b, 0206c), extension slots (0103a, 0103b), and connectors (0211a, 0211b). As a result of the insertion and pushing of a backup disk (0102) into the extension slot (0103a), the backup disk (0102) is connected to the connectors (0211a or 0211b). While there are three internal disks (0206) in the illustration shown in the diagram, this number may be more than or less than three. The controller (0210) may be configured from the front-end interface (0201), the memory controller (0202), processor (0203), the cache memory (0204), and the back-end interface (0205).

A plurality of logical units (LU) is formed according to storage space of the internal disks (0206a, 0206b, 0206c). In addition, one or more LU can be formed according to storage space of the backup disk (0102). Hereinafter, the LU formed according to storage space of the internal disks (0206a, 0206b, 0206c) are referred to as "internal LU", and the LU formed according to storage space of the backup disk (0102) is referred to as "backup LU".

The front-end interface (0201) constitutes an interface apparatus by which a host computer (for example, server) (0207) and the storage system (0101) are connected (for example, connected by way of a communication network). A microprogram for implementing I/O processing and backup processing and so on is actuated by the processor (0203). The cache memory (0204) performs the roles of, for example, temporarily storing data to be written in the internal LU, temporarily storing data read from the internal LU, and storing constituent information pertaining to the configuration of the storage system (0101). The back-end interface (0205) constitutes an interface by which the processor (0203) reads and writes data from the internal disk (0206) and the backup disk (0102) (the backup disk (0102) inserted in the extension slot (0103)). The memory controller (0202) performs the role of, for example, data movement between the previously-described constituent elements (0201, 0203, 0204, 0205) and control signal transfer.

Figure 9:
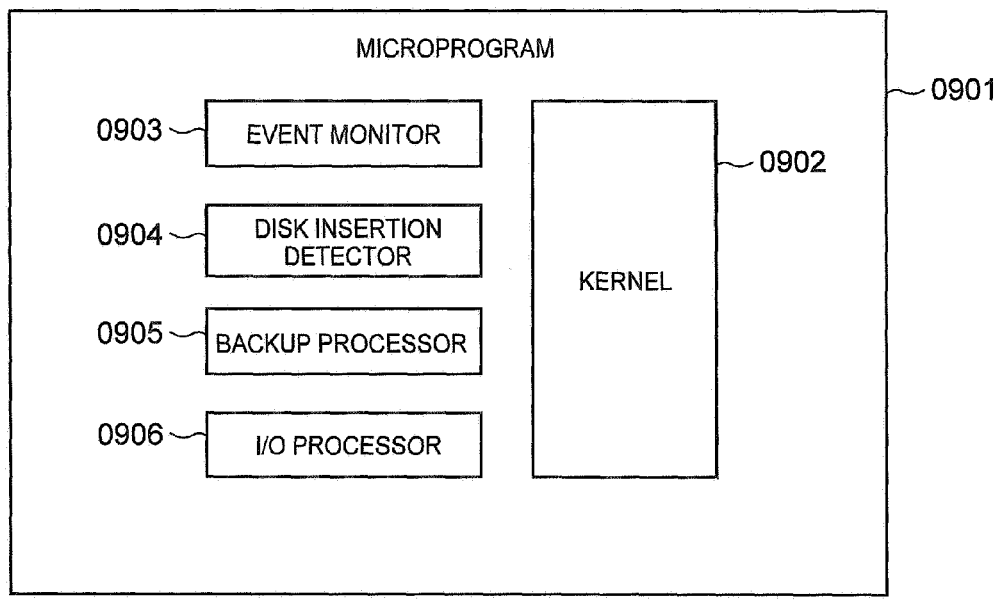
FIG. 9 shows an example configuration of a module of a microprogram.

FIG. 9 is a block diagram showing an example configuration of a module of a microprogram (0901) executed by the processor (0203).

The microprogram (0901) includes an event monitor (0903), disk insertion detector (0904), backup processor (0905), I/O processor (0906), and kernel (0907).

The event monitor (0903) starts processing that corresponds to events occurring in the storage system (0101). More specifically, for example, the event monitor (0903) starts the backup processor (0905) when a user uses a management computer not shown in the diagram to request backup to the storage system (0101).

The disk insertion detector (0904) detects insertion of the backup disk (0102) in the extension slot (0103) and removal thereof from the extension slots (0103a, 0103b). Following detection, the disk insertion detector (0904) transfers the events to the event monitor (0903).

The backup processor (0905) performs, for example, backup request processing from the user, backup of data to the inserted backup disk (0102), and management of the backup progress conditions.

The I/O processor (0906) processes I/O requests to the internal LU received from the host computer (0207) at the front-end interface (0201). In addition, the I/O processor (0906) can manage a later-described bitmap for specifying data updated by internal LU while a drive is being removed.

Figure 10:
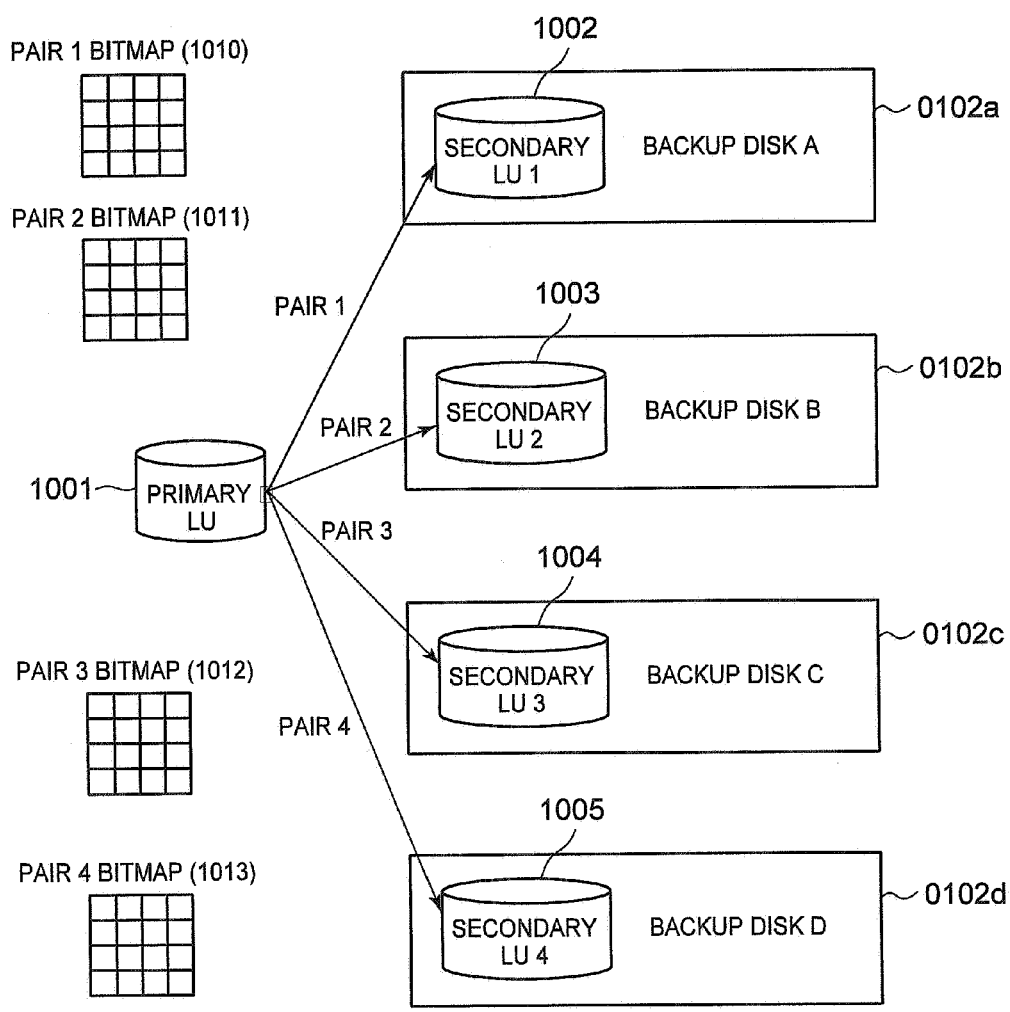
FIG. 10 shows the backup relationship between LU.

FIG. 10 shows the backup relationship between the LU. The LU of the plurality of internal LU serving as the copy original hereinafter referred to in the description as the "primary LU", while the LU configured as pairs with the primary LU serving as copy destinations are referred to as "secondary LU". The secondary LU are equivalent to the previously-described backup LU.

A primary LU (1001) constitutes a disk volume (logical volume formed utilizing a disk) in which business data (for example, data used by application programs executed by the host computer (0207)) is stored. Secondary LU (1002 to 1005) constitute disk volumes for acquisition of business data backup, the entity thereof being backup disks (0102a to 0102d) inserted in the extension slots (0103a, 0103b). In other words, in the example of FIG. 10, four backup disks (0102a to 0102d) are used in each single primary LU (1001).

Figure 20A:
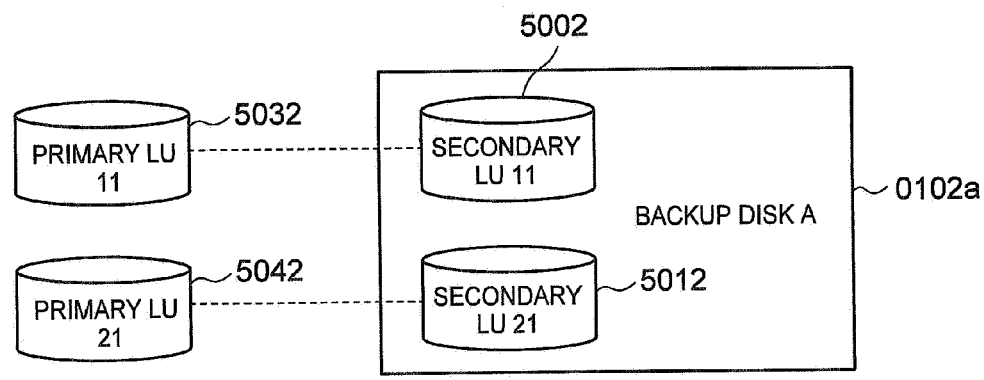
FIG. 20A shows the configuring of respective pairs of a plurality of secondary LU stored on a single backup disk with a plurality of primary LU.
Figure 20B:
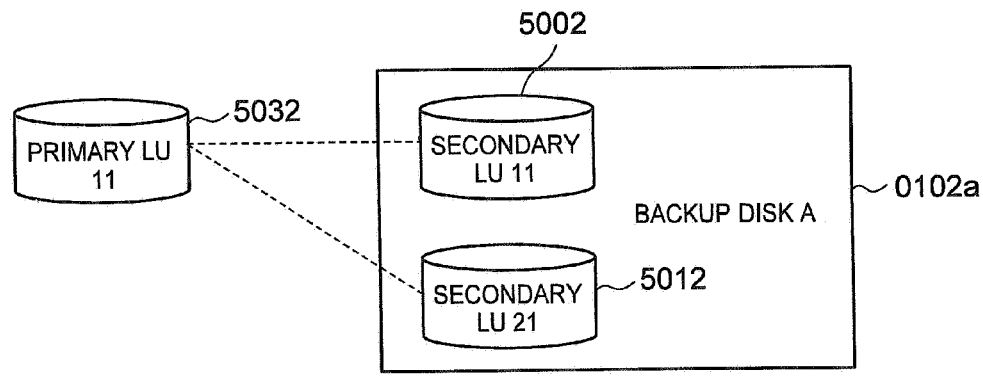
FIG. 20B shows the configuring of respective pairs of a plurality of secondary LU stored on a single backup disk with a single primary LU.

The pairs are configured from the primary LU (1001) and a secondary LU (1002 to 1005). The pairs illustrate the copy relationship between the LU. Here, the capacity of the primary LU and the capacity of the secondary LU (1002 to 1005) are the same. This example shows four pairs for which the primary LU (1001) serves as the copy original, the four secondary LU (1002 to 1005) corresponding to each of the four pairs being in each of the four different backup disks (0102a to 0102d). FIG. 10 illustrates an example in which a 4-backup generation of the primary LU (1001) is acquirable employing the backup disks (0102a to 0102d). The "4-generation" used here signifies four generations and does not signify the fourth generation. References made hereinafter to an $n^{th}$ (n is an integer of 1 or more) number of generations are expressed as an "$n^{th}$ generation". In addition, while FIG. 10 illustrates an example in which there is one secondary LU in a single backup disk, this is not restricted thereto and, for example, as illustrated in FIG. 20A, there may be a plurality of secondary LU (5002, 5012) that correspond to each of the plurality of primary LU (5032, 5042) in a single backup disk (0102a) or, as illustrated in FIG. 20B, there may be a plurality of secondary LU (5002, 5012) that correspond to a single primary LU (5032) in a single backup disk (0102a).

Bitmaps (1010 to 1013) of each pair are stored in, for example, the cache memory (0204). The bitmap (1010) expresses in which block of the primary LU (1001) of a pair 1 that corresponds with the bitmap (1010) there is a differential with the secondary LU (1002). More specifically, for example, the plurality of bits from which the bitmap (1010) is configured corresponds to the plurality of blocks from which each of the primary LU (1001) are configured. In addition, the plurality of blocks from which the secondary LU (1002 to 1005) are configured also correspond to the plurality of blocks from which the primary LU (1001) are configured. Incidentally, the blocks constitute a logical storage region of a predetermined size.

The differential management employing the bitmap (1010) is performed when the pair state of the pair 1 is a predetermined state (for example, a state other than a "COPY" or a "PAIR" state). This predetermined state is hereinafter referred to as a "suspend state" and is sometimes expressed as "PSUS". The "suspend state" ("PSUS") constitutes a state in which, even when a data block is written in a particular block of the primary LU (1001), the differential generated in this particular block is recorded in the bitmap (1010) even though the data block has not been copied to the block of the secondary LU (1002) that corresponds to this particular block. That is to say, when the pair state of the pair 1 is "PSUS" and a data block has been stored in a particular block of the primary LU (1001), because a differential is generated in the particular block the I/O processor (0906) sets bits that correspond with the particular block. In this embodiment, if the bits are ON (for example "1") it signifies the existence of a differential, and if the bits are OFF (for example "0") it signifies the absence of a differential. Incidentally, the timing at which the bits that correspond with the particular block are OFF constitutes the time at which copy of the differential data block (data blocks equivalent to the differential) from the particular block to the secondary LU block (the block that corresponds with the particular blocks) is completed.

Figure 14:
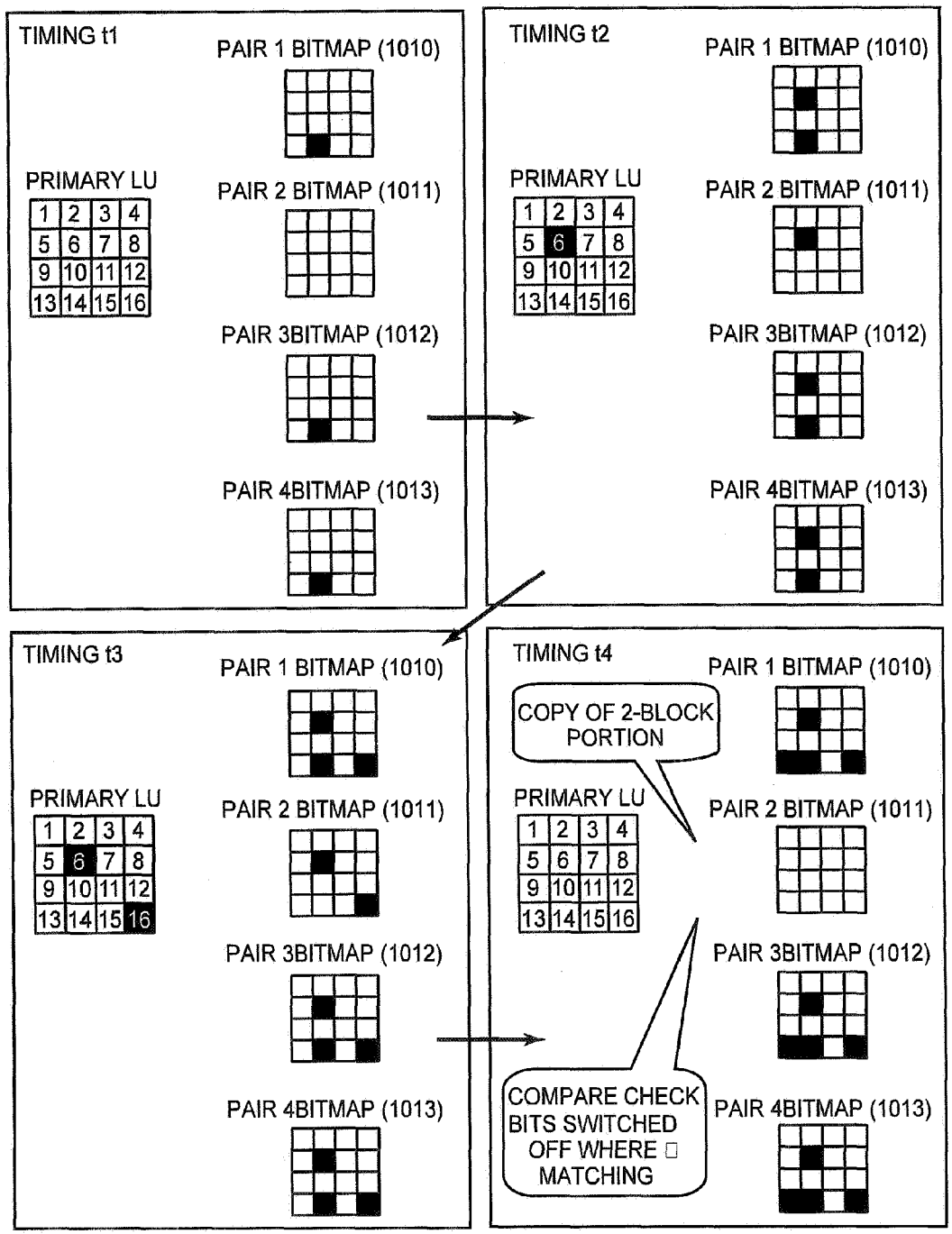
FIG. 14 shows one example of a bitmap updating process.

FIG. 14 shows one example of a bitmap updating process.

For example, at a time t1 there is a differential in block 14 of pair 1, there is no differential in pair 2, there is a differential in block 14 of pair 3, and there is a differential in block 14 of pair 4.

At a time t2 the I/O processor (0906) writes a data block in block 6. In this case, because a differential is generated in block 6 of each of the pairs 1 to 4, the I/O processor (0906) switches the bits that correspond to the block 6 to ON in each of the bitmaps (1010 to 1013).

At the time t3, the I/O processor (0906) writes an additional data block in block 16. In this case, because a differential is generated in block 16 of each of the pairs 1 to 4, the I/O processor (0906) switches the bits that correspond with the block 16 to ON in each of the bitmaps (1010 to 1013).

At the time t4, the data of the primary LU (1001) of pair 2 is copied by the backup processor (0905) into the secondary LU (1003). It is clear from the bitmap (1011) that corresponds with the pair 2 that data blocks equivalent to the differential between the primary LU (1001) and the secondary LU (1003) are located in blocks 6 and 16 of the primary LU (1001). For this reason, copy (backup) from the primary LU (1001) involves only the differential data blocks in blocks 6 and 16 being copied to blocks 6 and 16 of the secondary LU (1003). Whenever the copy of the differential data block is completed the bits of the differential data blocks that correspond with the copy original blocks are switched OFF.

More specifically, for example, the backup processor (0905) reads the data block of block 6 from the primary LU (1001), temporarily stores it in the cache memory (0204), and then issues a write command to the backup disk (0102b) to write the data block in block 6 of the secondary LU (1003). The backup disk (0102b) comprises a buffer for, for example, temporarily storing the data block designated by the received write command whereupon, when the data block is stored in the buffer and, subsequent to write completion by the backup processor (0905), the data block in the buffer is written in block 6 of the secondary LU (1003). When write completion is received from the backup disk (0102b), the backup processor (0905) sends a read command that designates block 6 of the secondary LU (1003) to the backup disk (0102b). The backup disk (0102b) receives the read command and, in response to the read command, sends the data block of block 6 of the secondary LU (1003) to the backup processor (0905). The backup processor (0905) compares the data block received in response to the read command with the data block temporarily stored in the cache memory (0204) (data block written in block 6 of the secondary LU (1003)). Because writing has been completed normally if the data blocks match, the backup processor (0905) switches OFF the bit of the bitmap (1011) that corresponds with block 6. On the other hand, because the writing is incomplete if the data blocks do not match, the backup processor (0905) does not switch OFF the bit of the bitmap (1011) that correspond with the block 6. The reading of the data block from the secondary LU and comparison of this data block with the backed up data block is hereinafter referred to as a "compare check".

Figure 11:
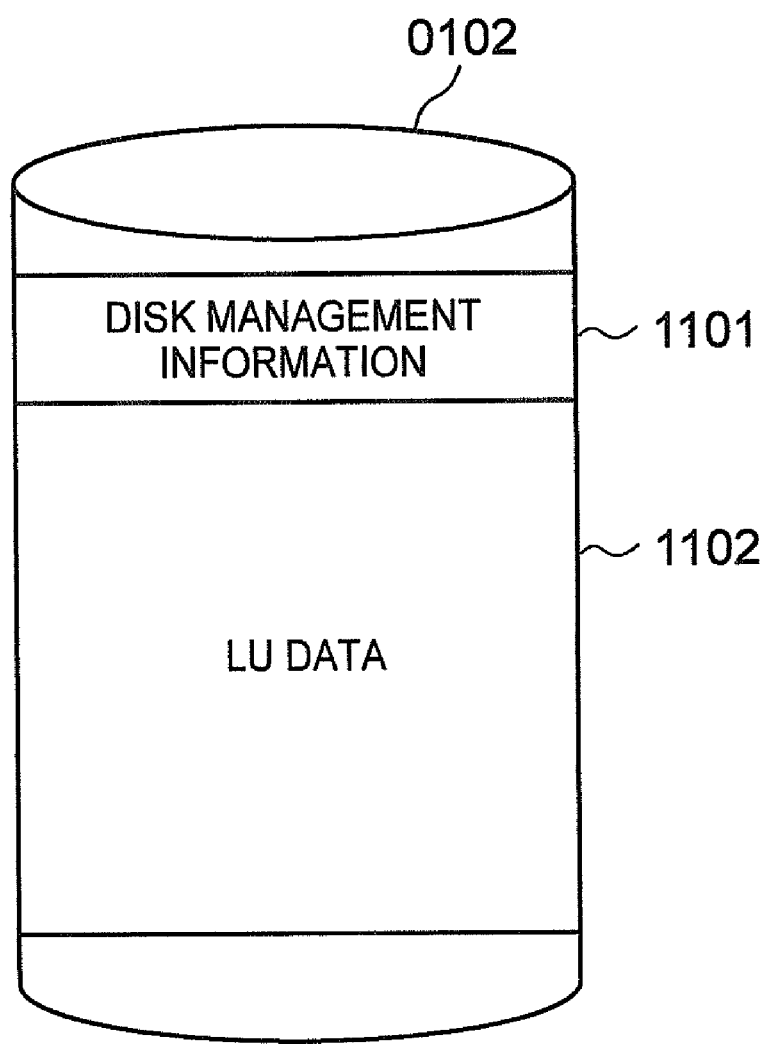
FIG. 11 shows information stored in a backup disk.

FIG. 11 shows an example configuration of storage space of the backup disk (0102).

The storage space of the backup disk (0102) may be broadly divided into a first region in which disk management information (1101) is stored and a second region in which LU data (1102) is stored. LU data constitutes the data stored in the secondary LU (backup LU). In other words, the second region constitutes a region that comprises one or more secondary LU.

FIG. 12A shows an example configuration of disk management information (1101). Hereinafter in the description given with reference to FIG. 12A and FIG. 12B, the backup disk in which this disk management information (1101) is stored is referred to as a "target backup disk".

The disk management information (1101) includes a disk identifier (1201) and a disk LU information element list (1202).

The disk identifier (1201) constitutes a unique identifier (ID) of the storage system (0101). The disk identifier (1201) can be configured from, for example, a combination of the manufacturing no. of the storage system (0101) and the manufacturing no. of the backup disk (0102) in which the disk management information (1101) is stored.

The disk LU information element list (1202) constitutes a list in which disk LU information elements (1203) for each of the number of disk LU of the backup disk (0102) are arranged. The disk LU refers to the secondary LU in the target backup disk (0102).

FIG. 12B shows an example configuration of disk LU information elements (1203). In the description given hereinafter with reference to FIG. 12B, the secondary LU (disk LU) that corresponds to the disk LU information elements (1203) is referred to as the "target secondary LU", and the pair comprising this secondary LU is referred to as the "target pair".

The disk LU information elements (1203) constitute information elements for managing the target secondary LU and includes, for example, disk LU no. (1204), LU size (1205), LU position (1206), pair no. (1207), pair state (1208), and final backup timing (1209).

The disk LU no. (1204) constitutes a unique no. of the backup disk (0102) and serves as an identifier assigned to the target secondary LU.

The LU size (1205) constitutes the size (capacity) of the target secondary LU.

The LU position (1206) constitutes the start address of the target secondary LU (address that expresses from where in the target backup disk (0102) the target secondary LU begins).

The pair no. (1207) constitutes a unique identifier of the storage system (0101)(target pair identifier).

The pair state (1208) constitutes the target pair state. When the target backup disk (0102) has been removed from the extension slot (0103), the pair state (1208) illustrates the target pair state at the time when the target backup disk (0102) was removed. In normal instances in this embodiment the pair state (1208) is converted from "COPY" to "PAIR" subsequent to backup completion (after copy completion) and, thereafter, is converted from "PAIR" to "PSUS". For this reason, the pair state (1208) when the target backup disk (0102) is removed subsequent to backup completion is "PSUS". The pair state (1208) formed if the target backup disk (0102) is removed during backup is either "COPY" or "PAIR". The pair state "COPY" refers to a state set by the backup processor (0905) when, for example, the backup processor (0905) receives a resynchronization command that designates a target pair of pair state "PSUS" from the host computer (0207) or a management computer not shown in the diagram, or when the backup processor (0905) performs a first copy from the primary LU to the target secondary LU (in other words, when new backup occurs), and constitutes a state that signifies a data block is being copied from the primary LU to the target secondary LU. The pair state "PAIR" signifies the primary LU and target secondary LU are in a synchronized state (same state). When the pair state is "PAIR" and a new data block is written in a particular block of the primary LU, the data block is also written (copied) in a block of the target secondary LU that corresponds to this particular block. Copy executed in response to a resynchronization command that designates a target pair of pair state "PSUS" involves implementation of a compare check and, if a match is obtained, bits corresponding to the bitmap being switched OFF. In addition, new backup involves all bits of the bitmap that correspond to the target pair when new backup is initiated being ON, and corresponding bits being switched OFF whenever the data block is copied and a match is obtained by a compare check. As a result of this kind of processing being executed, the pair state produced when the target backup disk (0102) removed during the course of backup is inserted again in the extension slot (0103) is either a "COPY" or "PAIR" state and, accordingly, the backup processor (0905) can detect removal during the course of backup, can ascertain from the bitmap that corresponds to the target pair which data blocks of the blocks of the primary LU are still incomplete, and can select and copy to the target secondary LU only the data blocks of incomplete copy (in other words, restart from an interrupted state is possible without need for exchange of backup from the beginning).

The final backup timing (1209) indicates at what time the backup of the primary LU data is supported in the target LU. The final backup timing (1209) can be issued as an index (criterion) for ascertaining the primary LU backup generation of the primary LU data supported in the target secondary LU.

FIG. 13 is a diagram for explaining a pair management table (1301).

The pair management table (1301) constitutes a table that is prepared for each pair and stored in a storage region (for example, cache memory (0204)) of the storage system (0101). In the description given hereinafter with reference to FIG. 13, a pair corresponding to the pair management table (1301) is referred to as a "target pair".

The pair management table (1301) constitutes a table for management of information pertaining to a target pair. For example, a pair no. (1302), primary LUN (1303), secondary LU disk identifier (1304), secondary LUN (1305), pair state (1306), and final backup timing (1307) are recorded in the pair management table (1301).

The pair no. (1302) constitutes a target pair identifier. The primary LUN (1303) constitutes a primary LU no. (identifier) from which a target pair configured. The secondary LU disk identifier (1303) constitutes a backup disk identifier in which the secondary LU from which the target pair is configured is stored. The secondary LUN (1305) constitutes a secondary LU no. (identifier) from which the target pair is configured. The pair state (1306) constitutes the target pair state. The final backup timing (1307) indicates the time at which the secondary LU from which the target pair is configured supports backup of the primary LU data. Instead of, or in addition to the final backup timing (1307), a backup generation that signifies the backup generation of the primary LU data may be recorded in the table (the same applies for the final backup timing (1209) of the disk LU information explained with reference to FIG. 12B).

Figure 5:
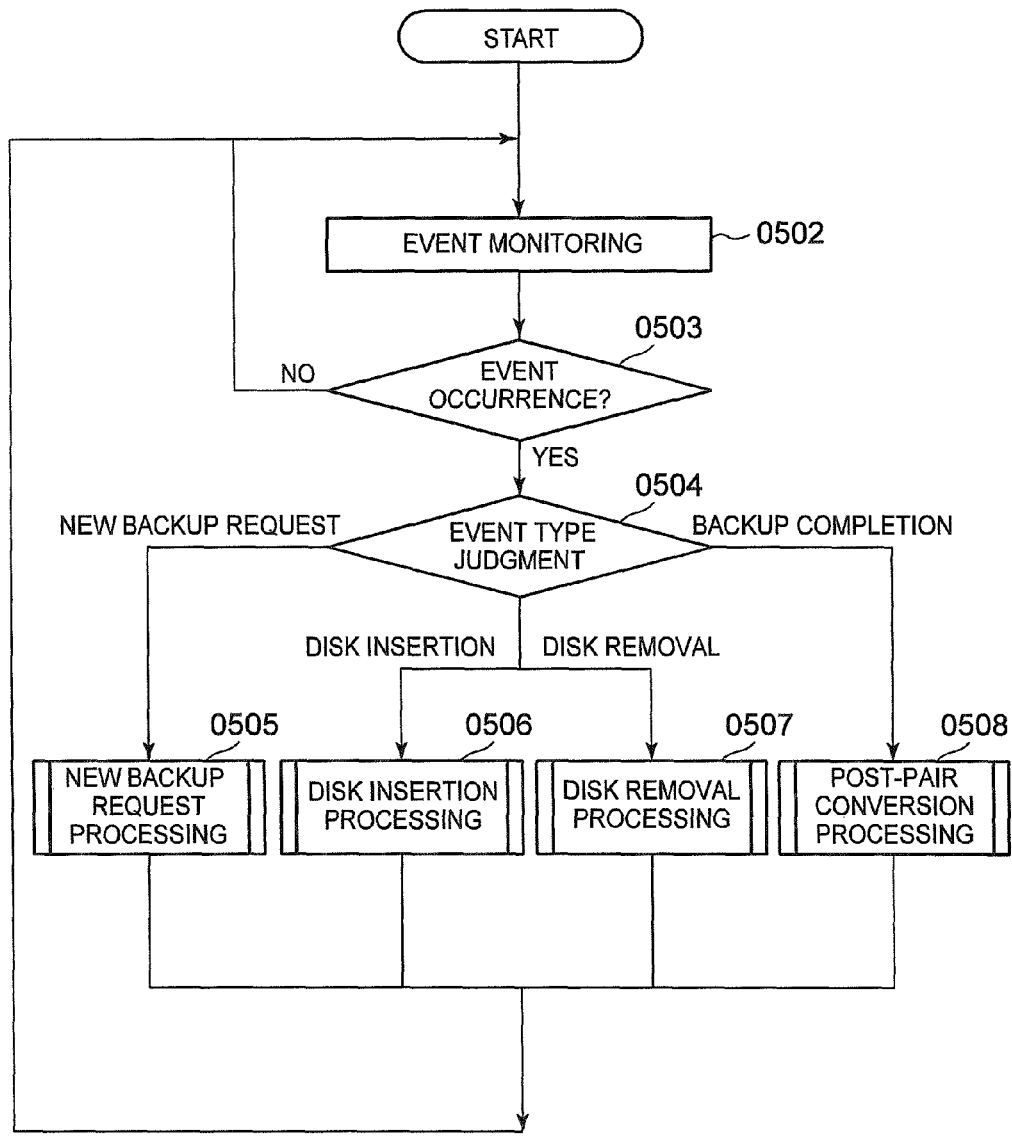
FIG. 5 shows one example of the processing flow executed by an event monitor.

FIG. 5 shows the processing flow of the event monitor.

In this embodiment, the event monitor (0903) is regularly started by means of a kernel (0902). It may also be started when an event occurs by another method based on interrupt processing.

The event monitor (0903), in Step 0502, checks what events have occurred. In Step 0503, if no events have occurred, the event monitor (0903) repeats the event monitoring (Step 0502). If an event occurs, the event monitor (0903), in Step 0504, judges what kind of event has occurred.

If the event constitutes a new backup request, the event monitor (0903), in Step 0505, starts new backup request processing. The new backup request is received from, for example, the host computer (0207) or a management computer not shown in the diagram. The new backup request contains, for example, the primary LUN of the primary LU serving as the copy original of the plurality of internal LU.

If the event is insertion of the backup disk (0102) in the extension slot (0103), the event monitor (0903), in Step 0506, starts disk insertion processing. The event of the backup disk (0102) being inserted in the extension slot (0103) is detected by the disk insertion detector (0904) and reported to the event monitor (0903).

If the event is removal of the backup disk (0102) from the extension slot (0103), the event monitor (0903), in Step 0507, starts a disk removal processing. The removal of the backup disk (0102) from the extension slot (0103) is detected by the disk insertion detector (0904) and reported to the event monitor (0903).

If the event is backup completion (that is to say, if the pair state has been converted from "COPY" to "PAIR"), the event monitor (0903), in Step 0507, starts a post-PAIR conversion processing.

Figure 6:
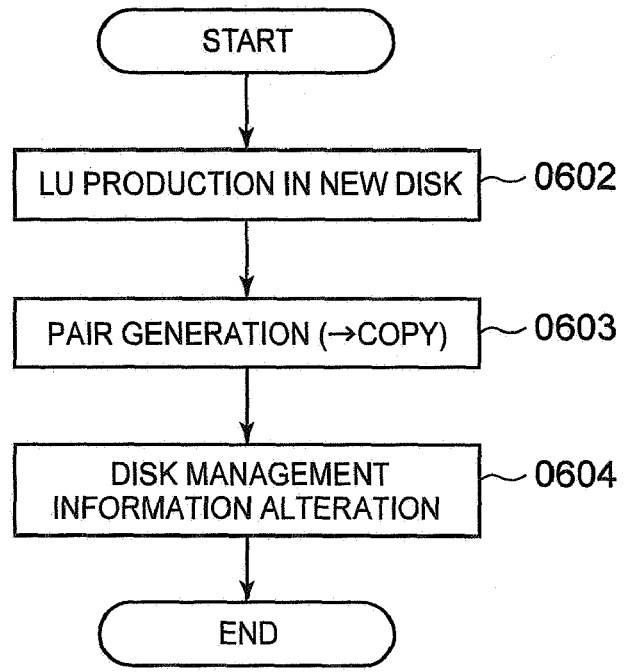
FIG. 6 shows one example of the processing flow of new backup request processing.

FIG. 6 shows the processing flow of new backup request processing. This processing is performed by the backup processor (0905).

The backup processor (0905), in Step 0602, produces, in the backup disk (0102) of insertion, a secondary LU of a capacity the same as the primary LU that corresponds with the primary LUN contained in the new backup request.

Next, in Step 0603, the backup processor (0905) generates a pair configured from a primary LU and a secondary LU. More specifically, for example, the backup processor (0905) prepares the pair management table (1301) and bitmap that corresponds with the pair, and records the primary LUN of the primary LU and the secondary LUN of the secondary LUN in the table (1301). The secondary LUN may be the LUN contained in the new backup request, or it may be an LUN automatically assigned by the backup processor (0905). In the explanation given hereinafter with reference to FIG. 13, the generated pair is referred to as "pair 1", the primary LU from which the pair 1 is configured is referred to as the "primary LU1", and the secondary LU from which the pair 1 is configured is referred to as the "secondary LU1".

In addition, in Step 0603, the backup processor (0905) records "COPY" as the pair state (1306) of the pair 1 in the prepared pair management table (1301) mentioned above. At this time, the backup processor (0905) initiates copy of all data blocks of the primary LU1 to the secondary LU1. For this reason, the backup processor (0905) switches ON all bits from which the prepared bitmap mentioned above is configured. Thereupon, whenever data blocks of the primary LU1 are copied to the secondary LU1, the backup processor (0905) executes the compare check mentioned above and, if a match is obtained, switches OFF the bits that correspond with the copy original block of the data block for which the match was obtained.

If all bits are OFF, the backup processor (0905), in Step 0604, updates the disk management information to the backup disk (0102). More specifically, for example, if there is a secondary LU already and a new secondary LU1 is generated by the current new backup request processing, the backup processor (0905) newly stores the new disk LU information element (1203) that corresponds with the pair 1 in the backup disk (0102). Or, for example, if the secondary LU is first stored in the backup disk (0102) as a result of the current new backup request processing, the backup processor (0905) stores the disk management information (1101) containing the disk identifier and the disk LU information element (1203) that correspond with the pair 1 in the backup disk (0102).

Figure 3:
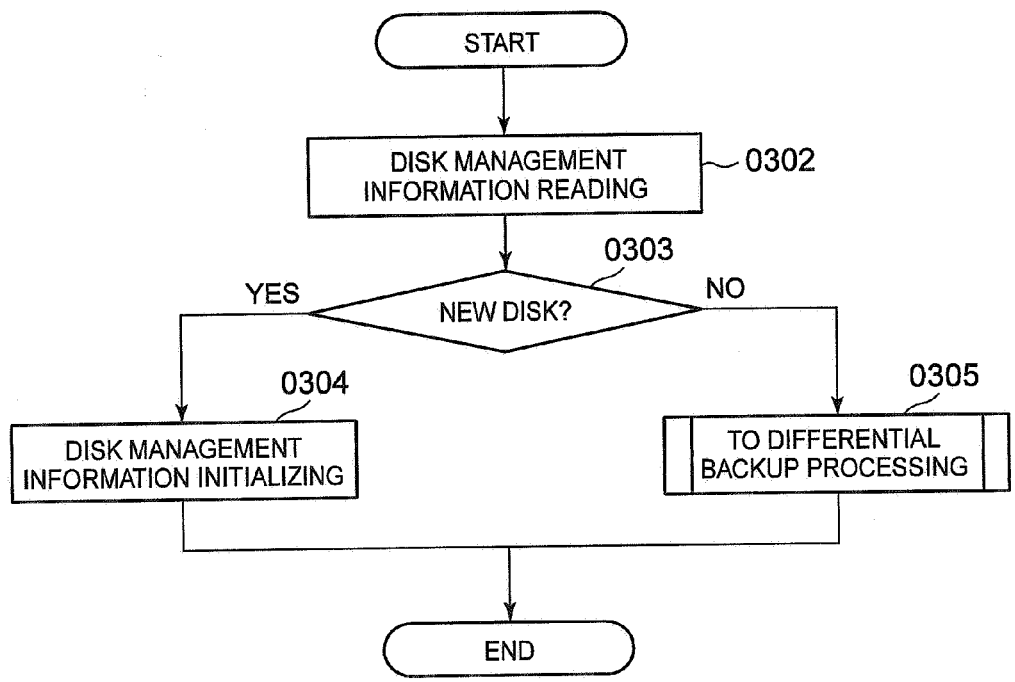
FIG. 3 shows one example of the processing flow of disk insertion processing.

FIG. 3 shows the processing flow of disk insertion processing. This processing is performed by the backup processor (0905).

In Step 0302, the backup processor (0905) reads out the disk management information (1101) from the inserted backup disk (0102). In Step 0303, if the backup disk is a new disk (for example, if the disk identifier (1201) is blank), in Step 0304, the backup processor (0905) initializes the disk management information (1201) of the backup disk. If the initialization of the disk management information (1101) is already finished, the backup processor (0905), in Step 0305, starts differential backup processing.

Figure 4:
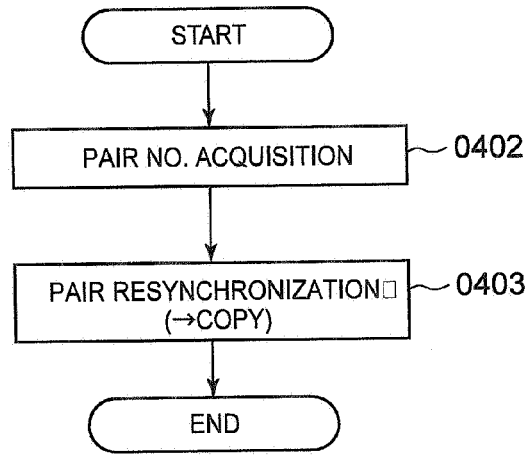
FIG. 4 shows one example of the processing flow of differential backup processing.

FIG. 4 shows the processing flow of differential backup processing. This processing is performed by the backup processor (0905).

In Step 0402, the backup processor (0905) reads the disk management information (1101) from the backup disk (0102) and acquires the pair no. (1207) from the disk management information (1101).

Next, in Step 0403, the backup processor (0905) performs resynchronization with a pair (hereinafter taken to be the "pair 1") that corresponds to the acquired pair no. That is to say, while the new backup request processing is executed in response to, for example, receipt of a new backup request, the differential backup processing is automatically initiated in response to detection of insertion of the backup disk (0102) in which the secondary LU is stored. The resynchronization involves the backup processor (0905) converting the pair state to "COPY" and, referring to the bitmap that corresponds to the pair 1, copying the data blocks (differential data blocks) of the primary LU blocks that correspond with the ON bits of the bitmap (blocks from which the primary LU is configured) to the secondary LU1 from which the pair 1 is configured (in other words, copy of the differential data blocks on the primary LU1 of the pair 1 updated from the final backup timing to the present time to the secondary LU1). At this time, the backup processor (0905) performs the compare check as described above and, if a match is obtained, switches OFF the bits that correspond with the primary LU that correspond to the differential data blocks for which the match was obtained. If all bits of the bitmap are switched OFF (in other words, copy of all differential data blocks is completed), the backup processor (0905) converts the pair state of the pair 1 from "COPY" to "PAIR".

Moreover, differential backup processing involves, for example, when there are a plurality of secondary LU (5002, 5012) from which respective pairs with a single primary LU (5032) are configured in a single backup disk (0102a) as illustrated in FIG. 20B, the backup processor (0905) selecting a single secondary LU from the plurality of secondary LU (5002, 5012) and copying the differential data blocks to the selected secondary LU. A range of conditions may be adopted for the selected secondary LU including, for example, the secondary LU being configured from the pair of oldest final backup timing.

Figure 7:
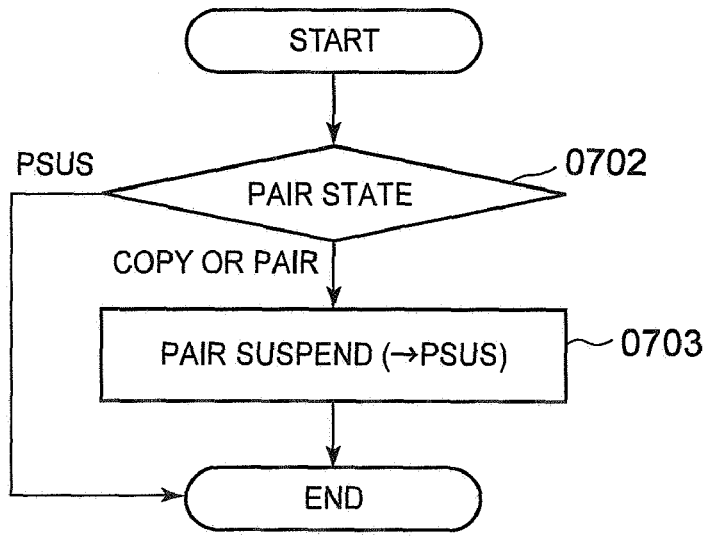
FIG. 7 shows one example of the processing flow of disk removal processing.

FIG. 7 shows the processing flow of disk insertion processing. This processing is performed by the backup processor (0905).

The backup processor (0905), in Step 0702, checks the pair state of one or more pairs that correspond respectively to the one or more secondary LU of the removed backup disk.

For a pair of pair state "PSUS" the backup is complete and, accordingly, the processing by the backup processor (0905) is complete without further actuation.

For a pair of pair state "COPY" or "PAIR" the backup is incomplete and, accordingly, the backup processor (0905), in Step 0703, performs conversion of the pair state of these pairs to "PSUS". At this time, according to the disk LU information elements (1203) of the disk management information (1101) of the removed backup disk (0102), the pair state (1208) of this pair remains as either "COPY" or "PAIR". The reason for this is because the disk LU information elements (1203) are not updated in accordance with the pair management table (1301) in which the pair state has been updated to "PSUS".

Figure 8:
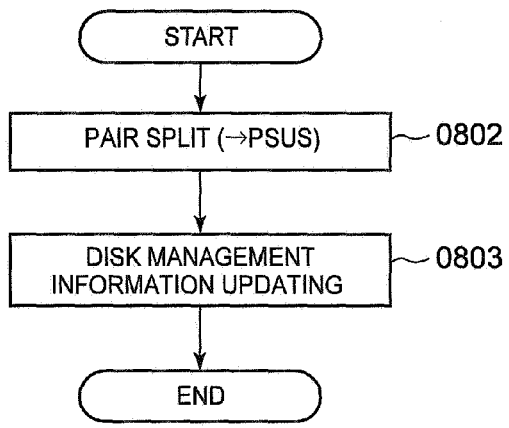
FIG. 8 shows one example of the processing flow of post-PAIR conversion processing.

FIG. 8 shows the processing flow of post-PAIR conversion processing. This processing is performed by the backup processor (0905).

The pair state "PAIR" signifies, for example, completion of the copy of differential data blocks from the primary LU to the secondary LU and matching of the primary LU with the secondary LU. In Step 0802, the backup processor (0905) performs conversion of the pair state of the corresponding pair in this processing to "PSUS". At this time, in order to maintain the integrity of the secondary LU data, a split processing of pairs of guaranteed write sequence is performed.

Next, in Step 0803, the backup processor (0905) updates the disk management information (1101) on the backup disk (0102) More specifically, for example, this processing involves the pair state (1208) or final backup timing (1209) of the disk LU information element (1203) that corresponds with the corresponding pair being updated (made the same as the pair state (1306) or final backup timing (1307) of the pair management table (1301) that corresponds with the corresponding pair). It is clear that, as a result, backup to the secondary LU of the backup disk (0102) can be accurately acquired.

According to the embodiment described above, where a number K of backup disks (0102) (while in the example of FIG. 10 K=4, K may be a natural number less than 4 or greater than 4) are used and the number P (P is a natural number) of extension slots (0103) is less than the number of K, if all the backup disks (0102) inserted in the extension slots (0103) are used backup of primary LU of a greater number of generations than the number of K can be saved in a K number of backup disks (0102).

Furthermore, according to the embodiment described above, backup is automatically initiated in response to detection of insertion of the backup disk (0102). This is convenient for the user because, using a host computer (0207) or a management computer or the like, backup is initiated even if no special backup request is made to the storage system (0101). Moreover, in addition to the initialization of the disk management information (1101) performed when the inserted backup disk (0102) is deemed to be a new disk of this embodiment, a new backup may be automatically initiated.

In addition, according to the embodiment described above, the pair no. and so on of the pair configured from the secondary LU stored in the backup disk (0102) are copied into the backup disk (0102), and the pair can be specified from the pair no. of this backup disk (0102). In addition, when the bitmaps of each pair are managed by the storage system (0101) and updated by the primary LU, the bits that correspond with the blocks of the location of updating are switched ON. When the backup disk (0102) is inserted, the bitmaps that correspond to the pair no. read from the backup disk (0102) are specified, the position of the differential data blocks in the primary LU from which the pair corresponding to the pair no. is configured is specified, and only the specified differential data blocks are copied. In a word, according to this embodiment, differential backup of backup initiated in response to detection of insertion of the backup disk (0102) can be performed.

Second Embodiment

A second embodiment of the present invention will be hereinafter described. The description focuses on points of difference with the first embodiment and omits a description of points common to the first embodiment.

Figure 15:
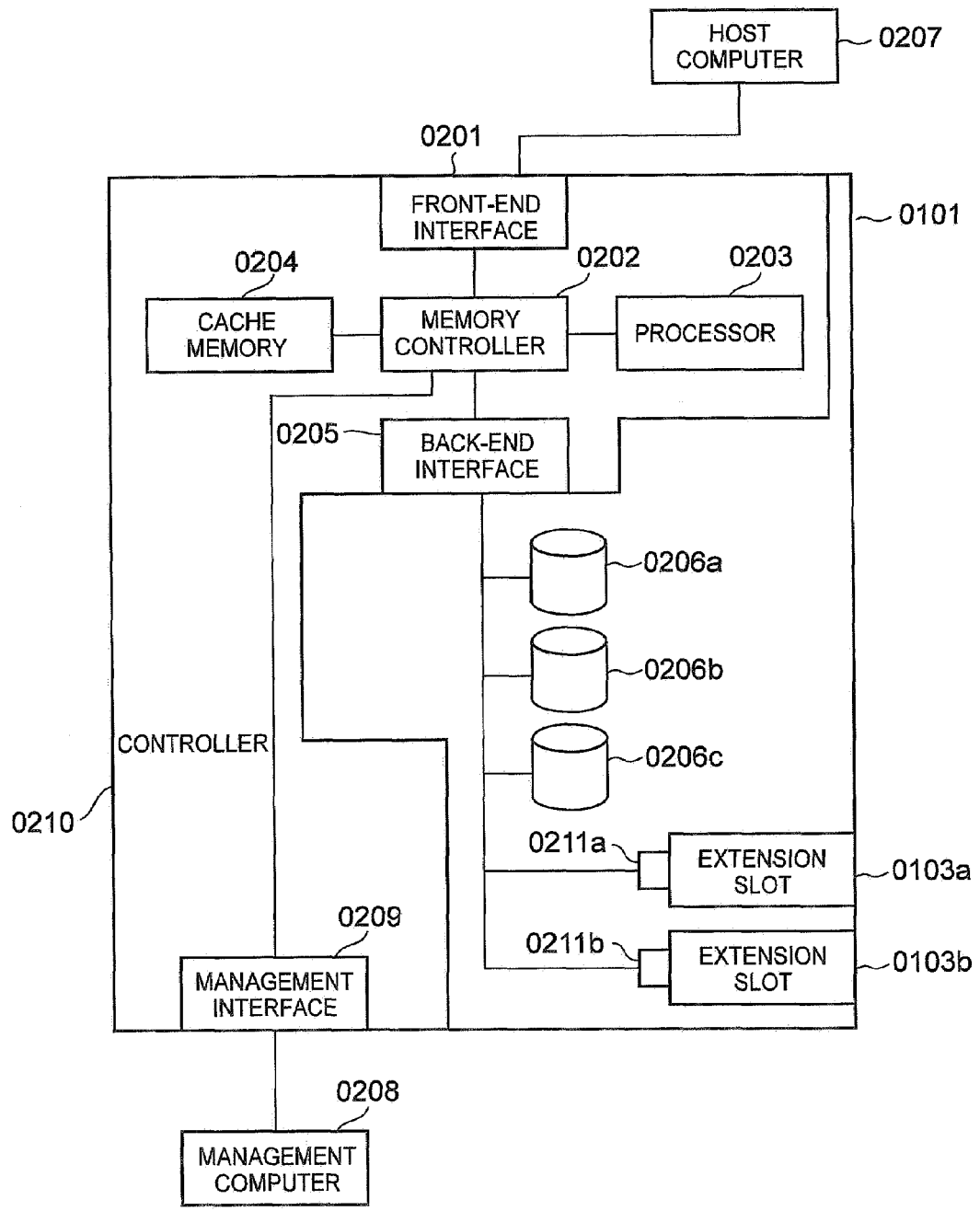
FIG. 15 shows an example configuration of a storage system pertaining to a second embodiment of the present invention.

FIG. 15 shows an example configuration of a storage system pertaining to a second embodiment of the present invention.

A storage system (1101a) comprises a management interface (0209) for communication with a management computer (0208). The management interface (0209) is connected to, for example, a memory controller (0202). The management computer (0208) may be a common computer that comprises, for example, a display apparatus and input device and so on. A management program or the like is executed by a processor (for example, CPU) of the management computer (0208).

Figure 17:
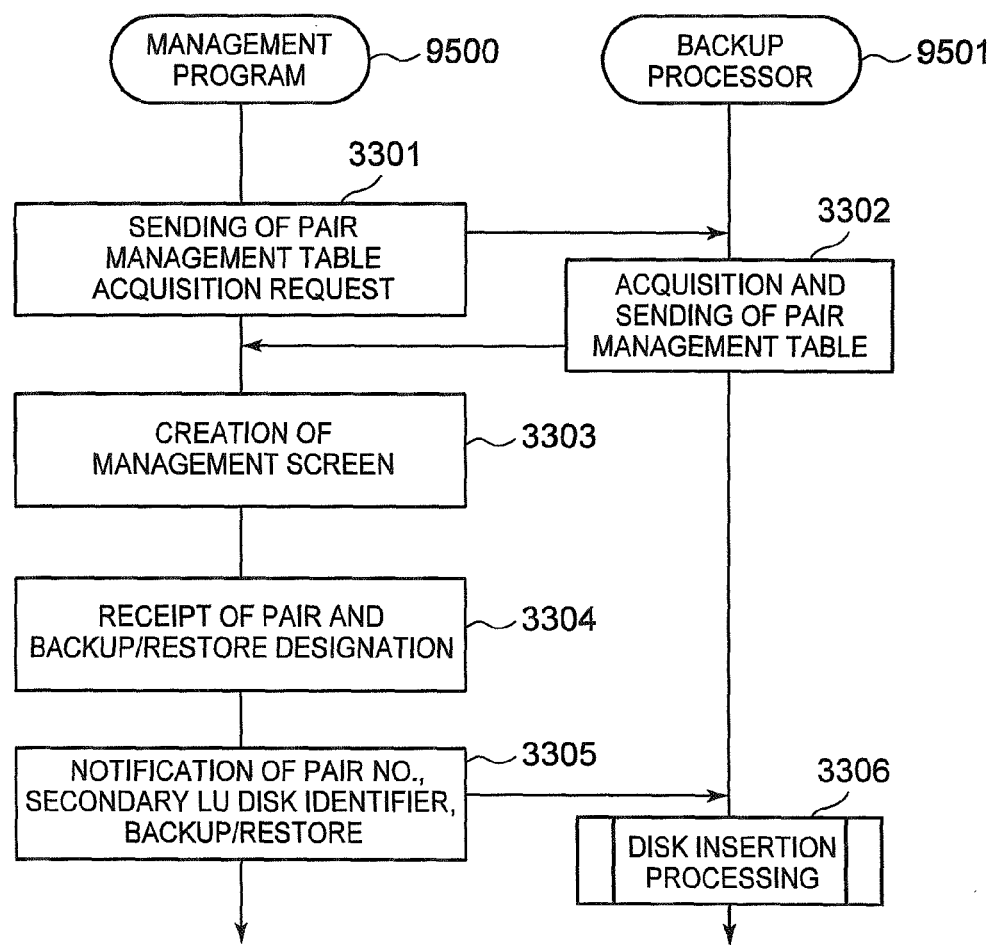
FIG. 17 shows one example of the processing flow executed by a management program and a backup-processor.

FIG. 17 shows the processing flow executed by a management program (9500) and a backup processor (0905').

In Step 3301, the management program (9500) sends a pair management table acquisition request to a storage system (0101'). In Step 3302, the backup processor (0905'), in response to the pair management table acquisition request, acquires the pair management tables (1301) of the storage system (0101') and sends them to the management computer (0208).

Figure 16:
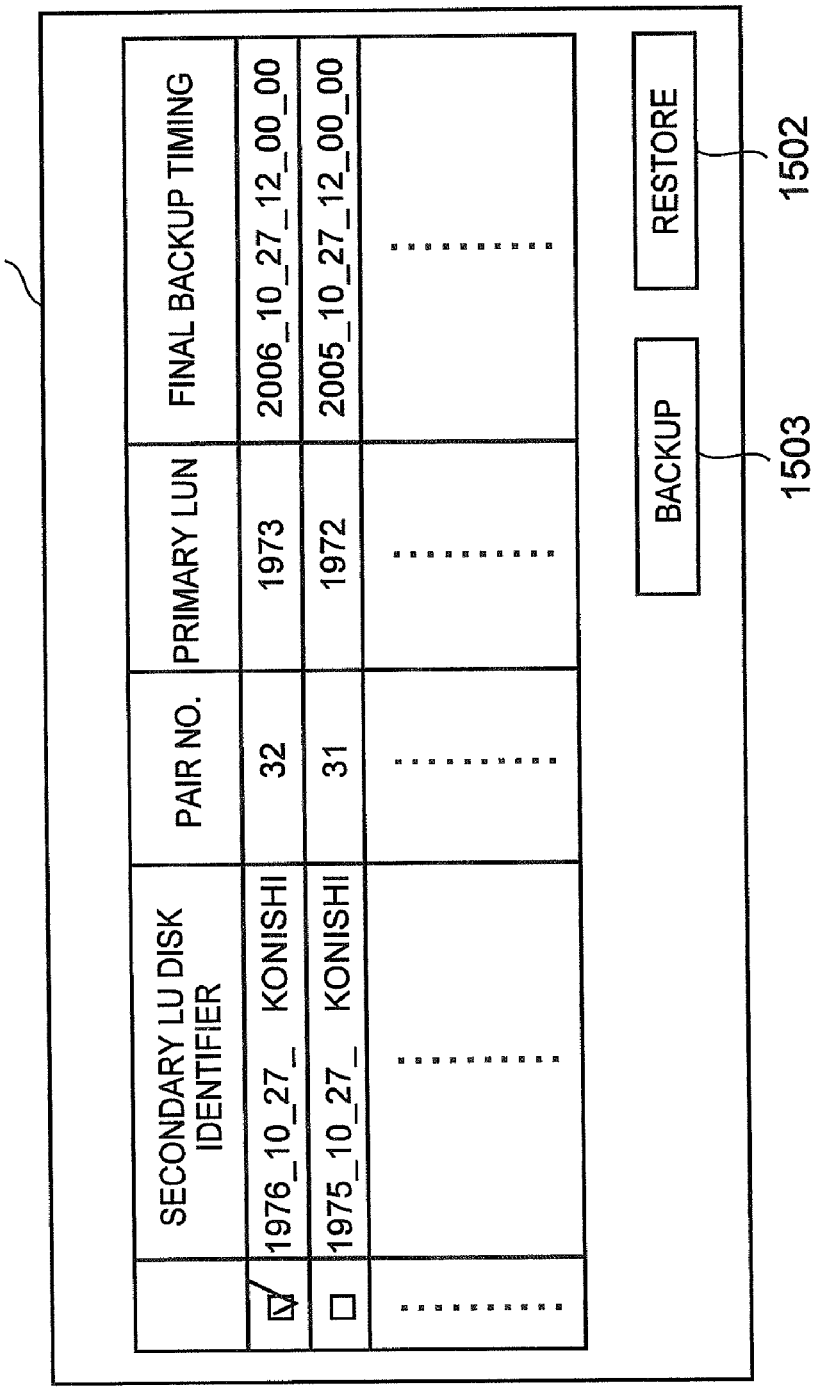
FIG. 16 shows one example of a management screen.

In Step 3303, the management program (9500), on the basis of information recorded in the received pair management tables (1301), generates and displays a management screen (1501) as illustrated in FIG. 16 (for example, a GUI (Graphical User Interface)). The management screen (1501) displays, for example, a secondary LU disk identifier, pair no., primary LUN and final backup timing for each backup disk. As a result, a user looking at the management screen (1501) can ascertain at what time and in which primary LU the backup was stored in what backup disk. In addition, the management screen (1501) displays a check box, a backup button (1503) and a restore button (1502) that have association with each pair.

In Step 3304, upon entry of a check mark in the check box that corresponds to the pair desired by the user (in other words, upon designation of the desired pair), the management program (9500) receives a command to execute either restore or command. If the user wishes to acquire backup of the designated pair the user pushes the backup button (1503) while, on the other hand, if the user wishes to perform restore of the designated pair the user pushes the restore button (1502).

In Step 3305, the management program (9500) notifies the backup processor (0905') of the pair no. of the designated pair, the secondary LU disk identifier of the backup disk comprising the secondary LU from which the pair is configured, and one of either backup or restore.

In Step 3306, the backup processor (0905') executes disk insertion processing when insertion of the backup disk (0102) is detected.

Figure 18:
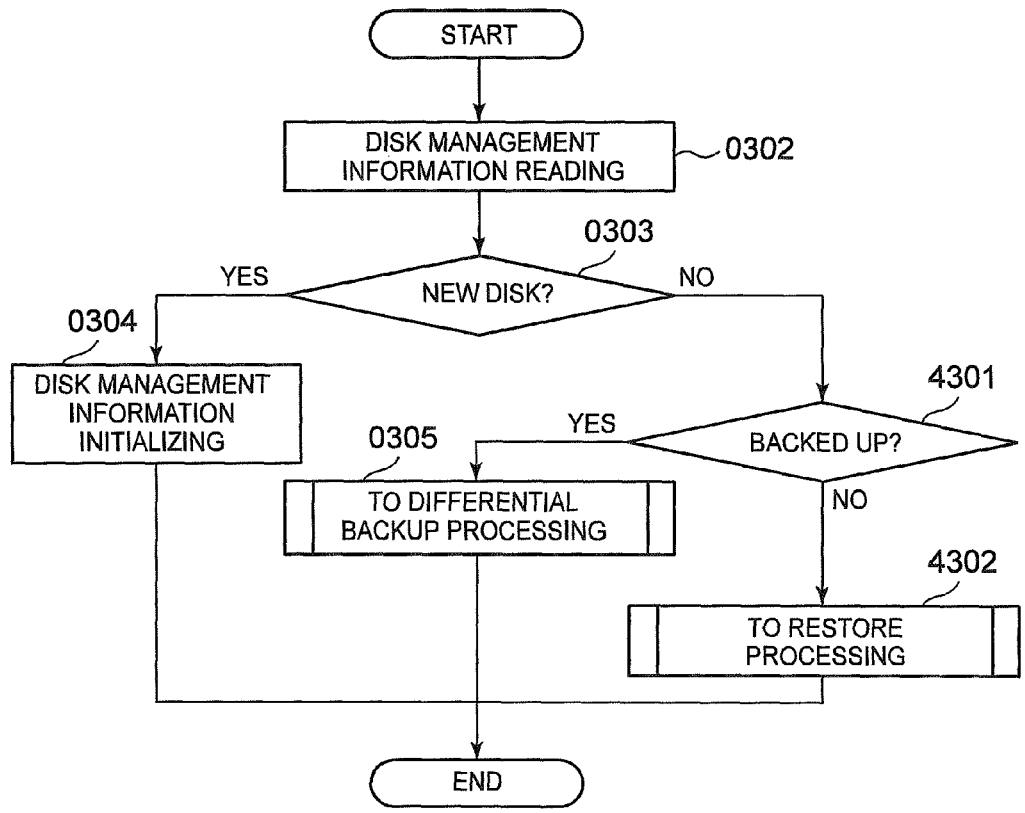
FIG. 18 shows one example of the processing flow of disk insertion processing of a second embodiment.

FIG. 18 shows the processing flow of the disk insertion processing of the second embodiment.

In Step 0303, when the disk is judged as not being new, the backup processor (0905'), in Step 4301, deems either backup or restore to be performed when the disk identifier (1201) of the inserted backup disk (0102) is the same as the secondary LU disk identifier notified from the management program (9500). Yes in Step 4301 occurs when backup is received from the management program (9500), and No in Step 4301 occurs when restore is received from the management program (9500). Restore processing (Step 4302) is executed if the judgment of Step 4301 is No.

Figure 19:
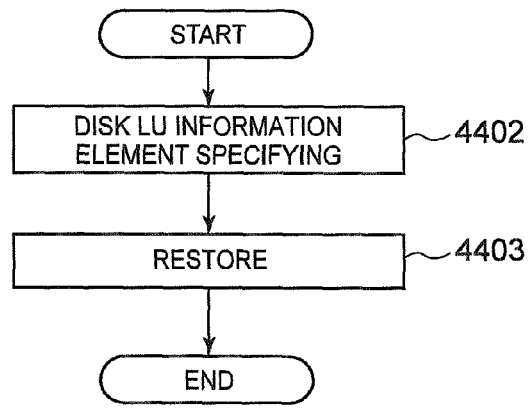
FIG. 19 shows one example of a restore processing flow.

FIG. 19 shows the restore processing flow.

In Step 4402, the backup processor (0905') specifies the disk LU information element (1203) containing the pair no. that is the same as the pair no. notified from the management program (9500) from the inserted backup disk (0102). The location of the secondary LU that corresponds with the pair no. in the backup disk (0102) is clear from the disk LU information element (1203).

In Step 4403, the backup processor (0905') copies all data blocks of the secondary LU that correspond with the pair no. to a primary LU that corresponds with this pair no. In other words, the secondary LU thereof is restored to the storage system (0101'). Moreover, replacing the pair no. that corresponds with the primary LU, the primary LU serving as the copy destination may serve as an empty internal LU formed utilizing the empty space of the internal disks (0206a to 0206c) (LU with a capacity of the capacity of the secondary LU of the copy original or greater).

According to the second embodiment outlined above, if a disk identifier or pair or which either backup or restore is to be executed is set in the storage system (0101') in advance, one of either backup or restore is automatically initiated in response to detection of insertion of the backup disk (0102). Moreover, while in this second embodiment the command is received from the management computer (0208), the command may instead be received from the host computer (0207).

In addition, the methods for designating which of either backup or restore is to be executed on the inserted backup disk (0102) are not restricted to methods based on commands received from the management computer (0208) or the host computer (0207) and, for example, the methods described in a third and fourth embodiment outlined below may be adopted.

Third Embodiment

Figure 21:
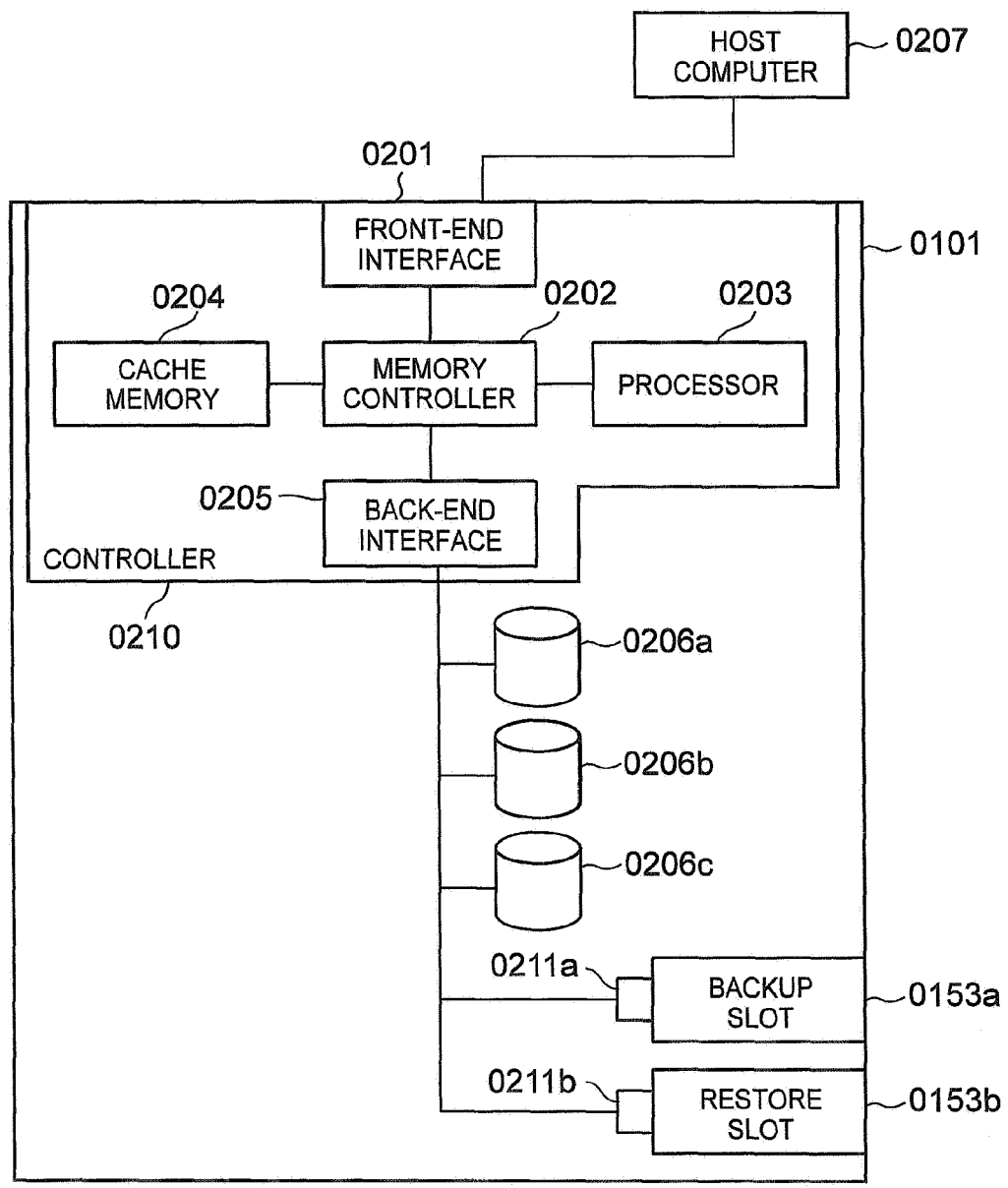
FIG. 21 shows an example configuration of a storage system pertaining to a third embodiment of the present invention.

FIG. 21 shows an example configuration of a storage system pertaining to a third embodiment of the present invention.

At least one extension slot (0153a) of a storage system (1101b) may serve as a backup extension slot (backup slot) while at least one extension slot (0153b) may serve as a restore extension slot (restore slot). In this case, when the user wishes to acquire backup, the desired backup disk (0102) is inserted in the backup slot (0153a), and when the user wishes to perform restore, the desired backup disk (0102) is inserted in the restore slot (0153b). When insertion of the backup disk (0102) in the backup slot (0153a) is detected, the processor (0905') performs backup on the inserted backup disk (0102) while, on the other hand, when insertion of the backup disk (0102) in the restore slot (0153b) is detected, it performs restore from the inserted backup disk (0102).

Fourth Embodiment

Figure 22:
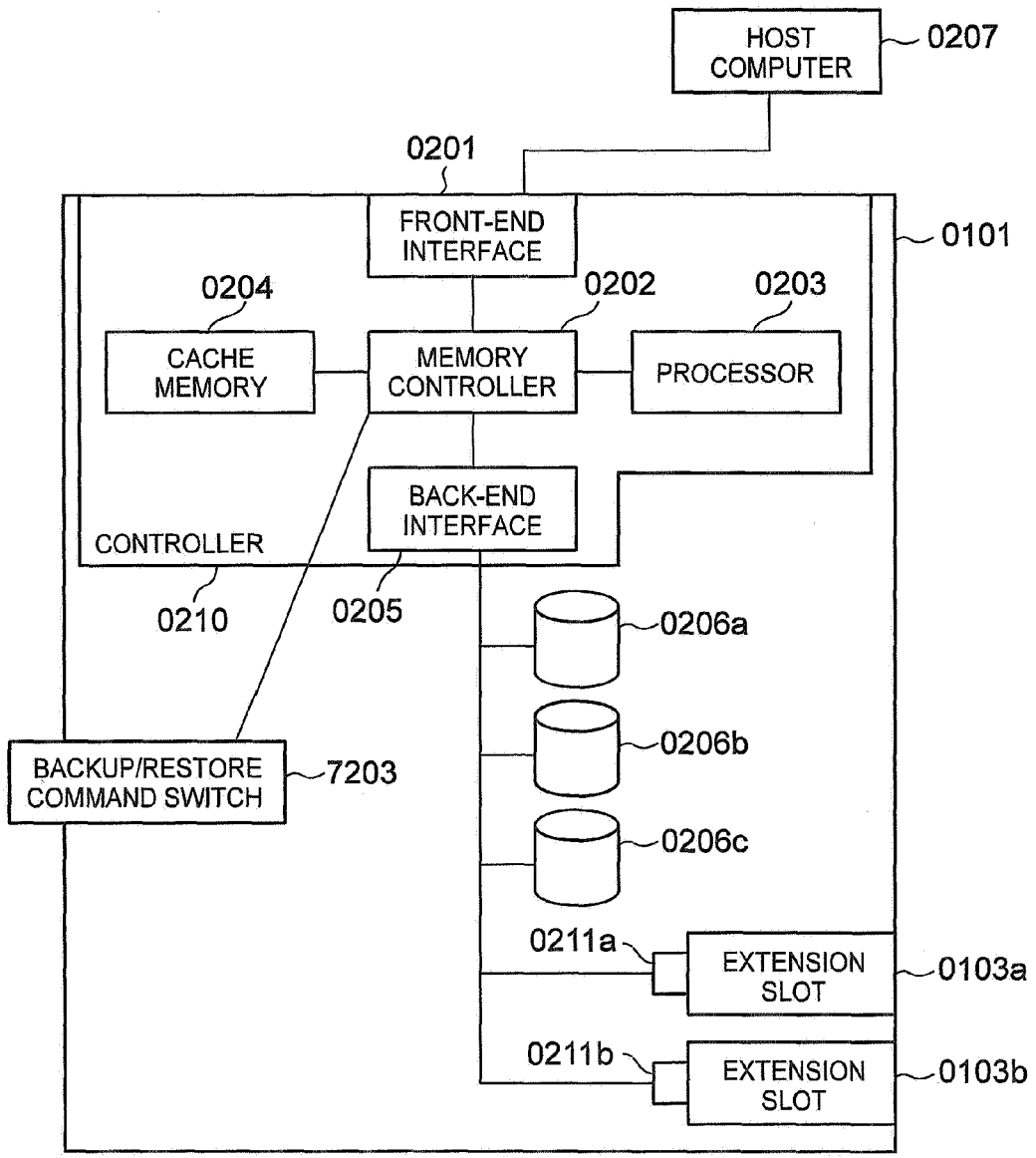
FIG. 22 shows an example configuration of a storage system pertaining to a fourth embodiment of the present invention.

FIG. 22 shows an example configuration of a storage system pertaining to a fourth embodiment of the present invention.

A backup/restore command switch (7203) may be provided in a storage system (1101c). When the backup/restore command switch (7203) is set to backup, a backup processor (0905') performs backup on the inserted backup disk (0102) while, on the other hand, when the backup/restore command switch (7203) is set to restore, it performs restore from the inserted backup disk (0102).

While several embodiments of the present invention are described above these are examples used to explain the present invention and, accordingly, the range of the present invention should not be assumed as being restricted by these embodiments. A variety of other modes thereof can be used to carry out the present invention.

What is claimed is:

1. A storage system comprising:
   a storage resource comprising one or more first storage devices;
   a first logical volume formed according to storage space of said storage resource;
   a member for accommodating a removable second storage device selected by a user, said removable second storage device storing disk management information;
   a detector for detecting mounting of said selected removable second storage device in said member, and
   a backup unit for, when said detector detects mounting of said selected removable second storage device in said member:
      determining whether the management information stored in said selected removable second storage device includes a disk identifier by reading said disk management information from said selected removable second storage device, a presence of said disk identifier in said management information indicating said selected removable second storage device has been previously mounted in said member,
      in case that said management information includes said disk identifier executing processing (a) and (b):
      (a) backup of data stored in said first logical volume to a second logical volume which is formed according to storage space of a removable second storage device mounted in said member, and which is paired with said first logical volume, and
      (b) storing, in said storage resource of, a backup generation information element related to what generation of backup a current backup of said first logical volume is,
      in case that said management information does not include said disk identifier executing processing (d):
      (d) initializing said management information stored in said selected removable second storage device,
   an I/O processor for receiving, from an external computer provided external of said storage system, an I/O request that designates said first logical volume and writing write target data designated by the I/O request in the first logical volume designated by the I/O request received from the external computer;
   wherein said storage resource stores differential management information elements that correspond with each of a plurality of pairs in which said first logical volume serves as a constituent element,
   wherein the differential management information elements being information elements that express positions, in said first logical volume, of differential data blocks that are data blocks equivalent to the differential between a second logical volume and said first logical volume which are the constituent elements of pairs corresponding to the differential management information elements,
   wherein said backup unit, in said (a) processing, specifies the positions of the differential data blocks in said first logical volume on the basis of differential management information elements, of said plurality of differential management information elements, that correspond with a target pair which constitutes a pair in which the second logical volume of the removable second storage device mounted in said member serves as a constituent element, and backs up the differential data blocks in the specified positions to positions of the second logical volume that correspond to the specified positions,
   wherein said storage resource further stores a pair state that corresponds to each plurality of pairs in which said first logical volume serves as a constituent element,
   wherein said I/O processor, when the pair state of the pairs in which said first logical volume serves as a constituent element is a first-type status and, whenever a data block of said write target data is written in said first logical volume, updates the differential management information elements that correspond to the pair to a state of existence of differential data blocks in the write destination position,
   wherein said backup unit initializes backup after updating the pair state that corresponds to said target pair to a second-type status and, when backup is completed, updates the differential management information elements that correspond with said target pair to a state of absence of differential data blocks, and updates the pair state that corresponds to said target pair to a first-type status, and
   wherein said backup unit, in said (b) processing, after updating the pair state that corresponds to said target pair to said first-type status, further stores in said removable second storage device pair management information elements that constitute information pertaining to said target pair, following which, when said removable second storage device is demounted from said member and the demounted removable second storage device or another storage device selected by said user has been newly mounted in said member, in said (a) processing, specifies differential management information elements that correspond to the pair management information elements of the removable second storage device mounted in said member.

2. The storage system as claimed in claim 1, further comprising a guard unit for guarding each of said one or more first storage devices against being demounted by said user.

3. The storage system as claimed in claim 1, wherein
   said member is provided in plurality,
   said plurality of members comprise a first member and a second member, and
   said backup unit executes said (a) processing when said selected removable second storage device is mounted in said first member and executes the following (c) processing when said selected removable second storage device is mounted in said second member:
   (c) restoring data of said second logical volume of a removable second storage device mounted in said second member to said first logical volume or to another first logical volume formed according to storage space of said storage resource.

4. The storage system as claimed in claim 1, further comprising an external command receiver for receiving, from an external computer provided external of said storage system, a command for executing either backup or restore, wherein
   said backup unit executes said (a) processing when said external command receiver receives a backup command, and executes the following (c) processing when said external command receiver receives a restore command:
   (c) restoring data of said second logical volume of a removable second storage device mounted in said member to said first logical volume or to another first logical volume formed according to storage space of said storage resource.

5. The storage system as claimed in claim 1, further comprising a backup/restore command receiver for receiving from said user a command for execution of either backup or restore, wherein said backup unit executes said (a) processing when said backup/restore command receiver receives a backup command, and executes the following (c) processing when said backup/restore command receiver receives a restore command:

(c) restoring data of said second logical volume of a removable second storage device mounted in said member to said first logical volume or to another first logical volume formed according to storage space of said storage resource.

6. The storage system as claimed in claim 1, wherein said backup unit, whenever a differential data block is backed up in said second logical volume, reads the differential data block from the second logical volume and compares the read differential data block with the backed up differential data block and, when these differential data blocks match, updates to a state of absence of differential data blocks in said specified positions the differential management information elements that correspond to said target pair.

7. The storage system as claimed in claim 1, further comprising a detector for detecting demounting of said removable second storage device from said member, wherein said backup unit alters the pair state that corresponds with said target pair to a first-type status in response to detection, by said detector, of demounting of said removable second storage device from said member.

8. The storage system as claimed in claim 1, wherein said backup unit, in said (b) processing, further stores in said removable second storage device pair management information elements that constitute information pertaining to said target pair, following which, when said second storage device is demounted from said member and the demounted removable second storage device or another storage device selected by said user is newly mounted in said member, in said (a) processing, specifies differential management information elements that correspond to the pair management information elements of the removable second storage device mounted in said member.

9. The storage system as claimed in claim 1, wherein the number of said mounting removable members is less than the number of first storage devices.

10. The storage system as claimed in claim 1, wherein said backup unit updates the pair state of said pair to be stored in said storage resource and stores the updated pair state in said removable second storage device.

11. The storage system as claimed in claim 1, wherein
a plurality of second logical volumes are formed in a single removable second storage device, and
said backup unit, in said (a) processing, backs up the respective data of said plurality of first logical volumes to said plurality of second logical volumes from which a plurality of respective pairs with said first logical volumes are configured.

12. The storage system as claimed in claim 1, wherein
a plurality of second logical volumes are formed in a single removable second storage device, and
said backup unit, in said (a) processing, backs up the data of said first logical volume to a second logical volume selected from said plurality of second logical volumes from which a plurality of respective pairs with said first logical volumes are configured.

13. The storage system as claimed in claim 1, further comprising an I/O processor for receiving an I/O request that designates said first logical volume from an external computer provided external of said storage system and writing write target data designated by the I/O request in the first logical volume designated by the I/O request received from the external computer, wherein
said storage resource stores differential management information elements and the pair state that corresponds with each of a plurality of pairs in which said first logical volume serves as a constituent element,
the differential management information elements being information elements that express positions, in said first logical volume, of differential data blocks that are data blocks equivalent to the differential between the second logical volume and said first logical volume which serve as the constituent elements of a pair corresponding to the differential management information elements, and
said I/O processor, when the pair state of a pair in which said first logical volume serves as a constituent element is the first-type status and, whenever a data block of said write target data is written in the first logical volume, updates the differential management information elements that correspond to the pair to a state of existence of differential data blocks in the write destination position, and
said backup unit, in said (a) processing, initiates backup after updating the pair state that corresponds to the target pair that constitutes the pair in which said second logical volume of the removable second storage device mounted in said member serves as a constituent element to a second type status, specifies the positions of the differential data blocks in said first logical volume on the basis of the differential management information elements, of said plurality of differential management information elements, that correspond with said target pair, backs up the differential data blocks of the specified positions to positions that correspond with the specified positions in the second logical volumes, updates the differential management information elements that correspond with said target pair to a state of absence of differential data blocks in the specified positions whenever backup of a single specified position is completed and, when the back up of all differential data blocks is completed, updates the pair state that corresponds to said target pair to the first-type status.

14. The storage system as claimed in claim 13, wherein
said backup unit, in said (b) processing, after the pair state that corresponds to said target pair has been updated to said first-type status, further stores pair management information elements that constitute information pertaining to said target pair in said removable second storage device, following which, when said removable second storage device is demounted from said member and the demounted removable second storage device or another storage device selected by said user is mounted in said member, in said (a) processing, specifies differential management information elements that correspond to pair management information elements of the removable second storage device mounted in said member, the specified differential management information elements being differential management information that corresponds with pairs in which the second logical volumes of the second storage device serve as the constituent element.

15. The storage system as claimed in claim 13, comprising:
a first detector for detecting mounting of said removable second storage device in said member, and
a second detector for detecting demounting of said removable second storage device from said member, wherein
said backup unit executes said (a) and (b) processings in response to detection, by said first detector, of mounting of said removable second storage device in said member and, in response to detection, by said second detector, of demounting of said removable second storage device from said member, alters the pair state that corresponds with said target pair to a first-type status.

16. The storage system as claimed in claim 13, further comprising a guard unit for guarding against demounting of each of said one or more first storage devices by said user, the number of said members being less than the number of first storage devices.

* * * * *